(12) United States Patent
Ogawa

(10) Patent No.: US 11,659,267 B2
(45) Date of Patent: May 23, 2023

(54) ELECTRONIC DEVICE, CONTROL METHOD THEREOF, AND RECORDING MEDIUM

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/505,236

(22) Filed: Oct. 19, 2021

(65) Prior Publication Data
US 2022/0132024 A1    Apr. 28, 2022

(30) Foreign Application Priority Data

Oct. 22, 2020  (JP) .............................. JP2020-177596

(51) Int. Cl.
*H04N 5/232*   (2006.01)
*G06F 3/01*    (2006.01)

(52) U.S. Cl.
CPC ......... *H04N 5/23219* (2013.01); *G06F 3/013* (2013.01); *H04N 5/23229* (2013.01); *H04N 5/232945* (2018.08)

(58) Field of Classification Search
CPC .......... H04N 5/23219; H04N 5/23229; H04N 5/232945; H04N 5/232127; H04N 5/23218; H04N 5/232935; G06F 3/013
See application file for complete search history.

(56) References Cited

U.S. PATENT DOCUMENTS

| | | | |
|---|---|---|---|
| 2011/0128432 A1* | 6/2011 | Shiohara | H04N 5/232122 348/333.05 |
| 2016/0313891 A1* | 10/2016 | Tsuda | G06F 3/013 |
| 2019/0289220 A1* | 9/2019 | Yoshikawa | H04N 5/232945 |

FOREIGN PATENT DOCUMENTS

| | | |
|---|---|---|
| JP | H09114846 A | 5/1997 |
| JP | 2011-114573 A | 6/2011 |
| JP | 2014-514661 A | 6/2014 |
| WO | 2007/135835 A1 | 11/2007 |

* cited by examiner

*Primary Examiner* — Yogesh K Aggarwal
(74) *Attorney, Agent, or Firm* — Canon U.S.A., Inc. IP Division

(57) ABSTRACT

In an operation by line-of-sight input, a position (designated position) designated by a gaze point is easier to view after a determination operation is performed by a user than before the determination operation is performed. An electric device includes a detection unit configured to detect a gaze point, which is based on line-of-sight of a user viewing, on a display unit, and a control unit configured to display an indicator on the display unit indicating the gaze point, wherein in a case where an operation is performed on an operation unit by the user, the control unit performs control to display a display item at the gaze point and to display the indicator and the display item in a changed display order.

19 Claims, 15 Drawing Sheets

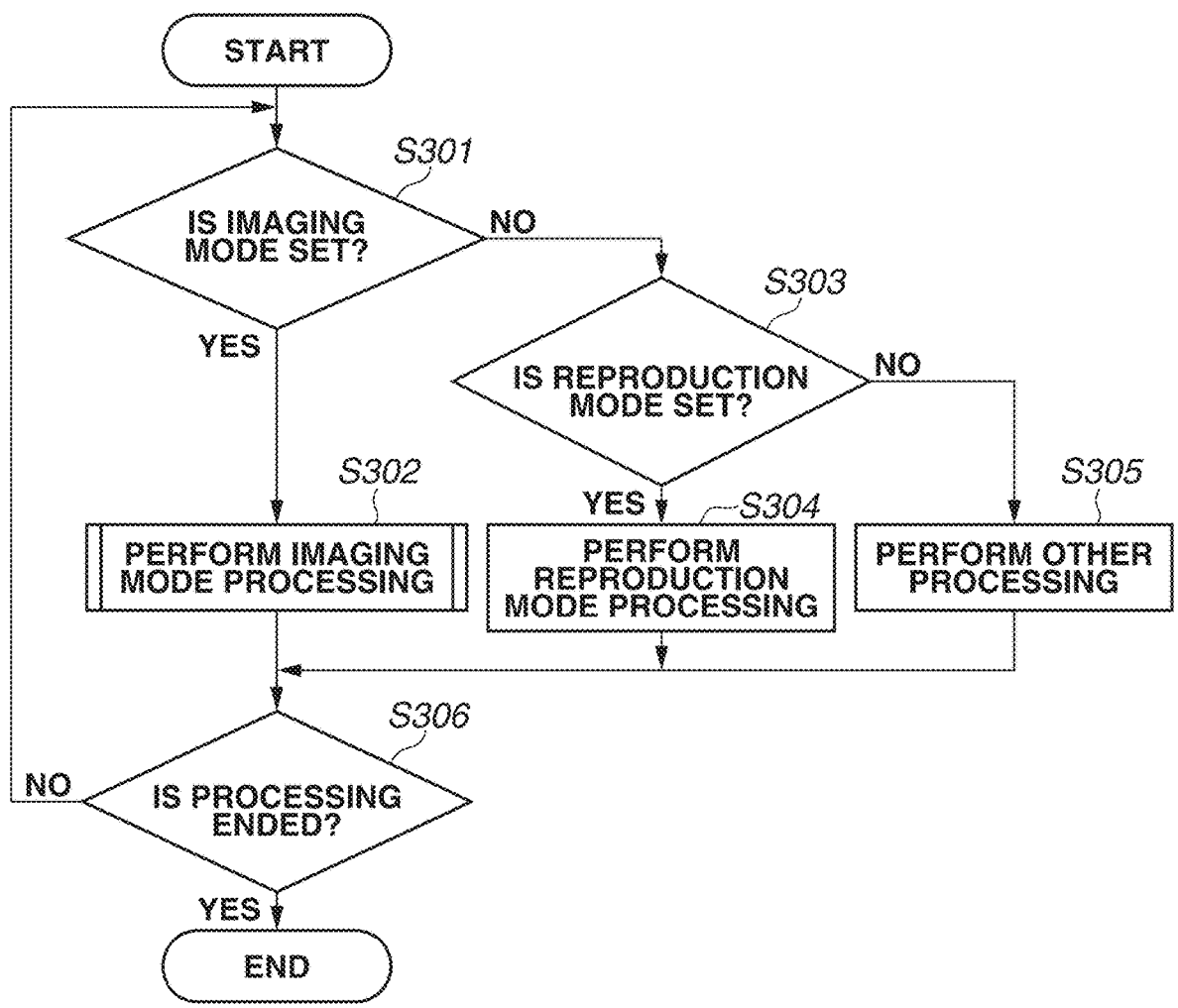

FIG.4A1
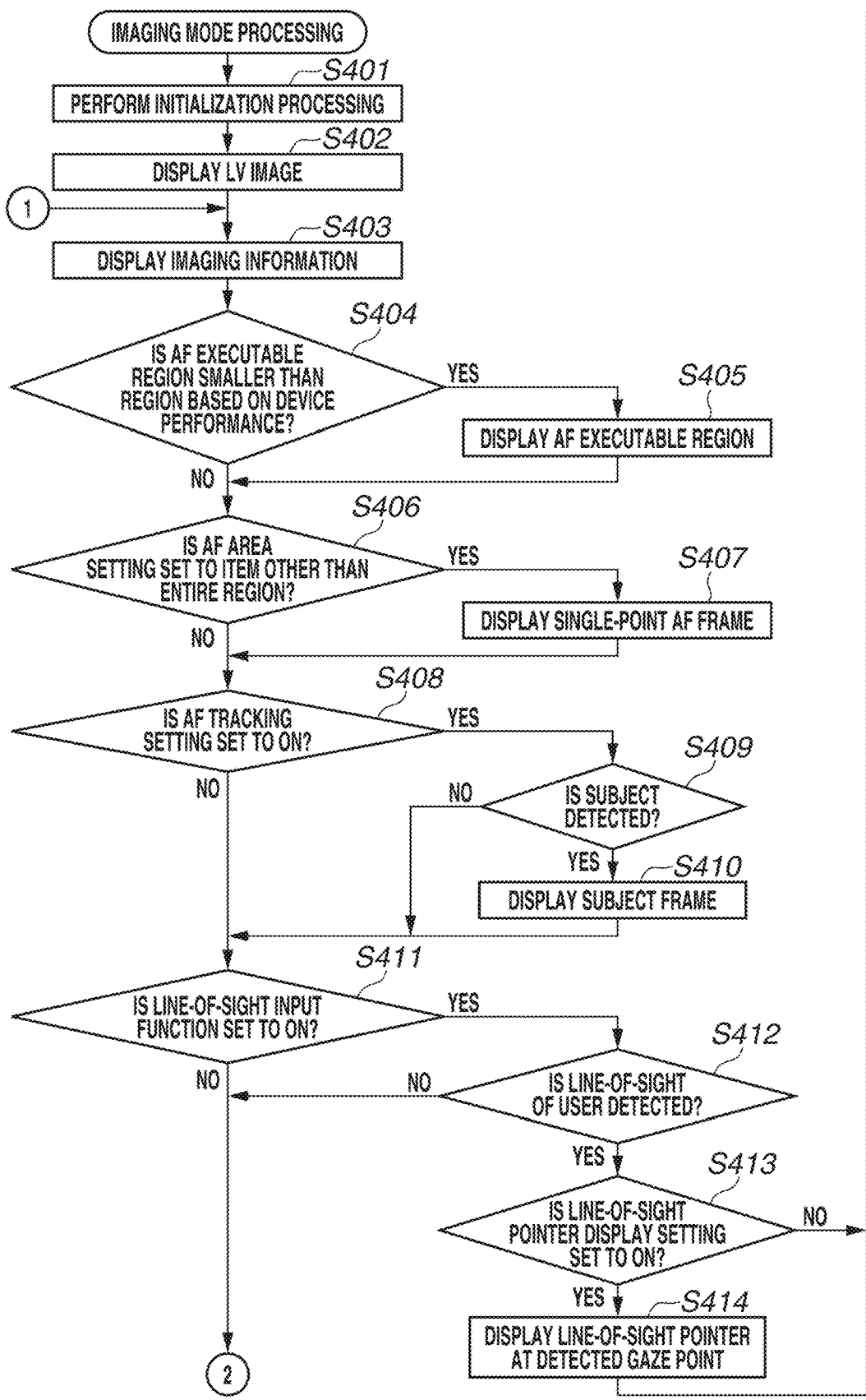

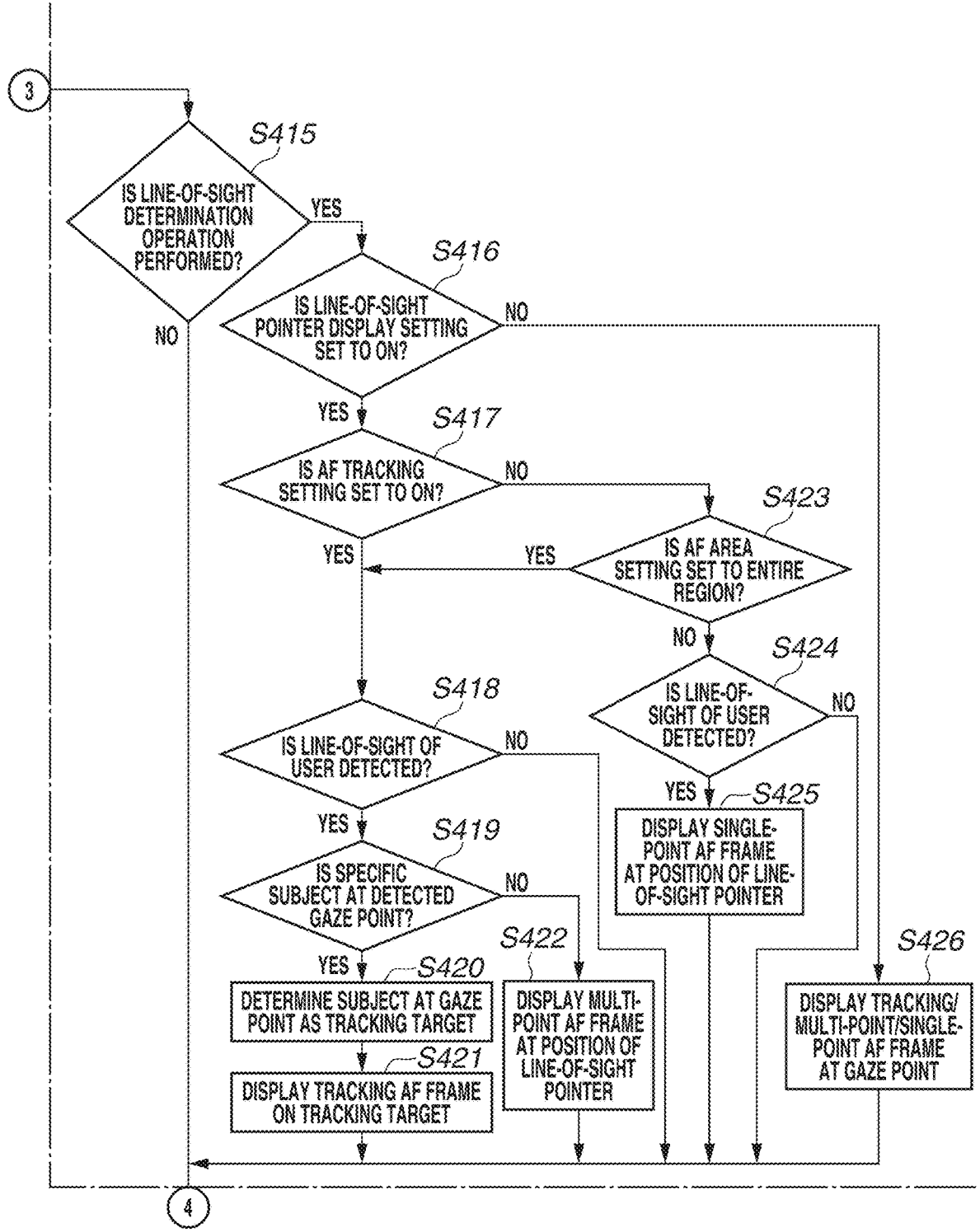
FIG.4A2

FIG.4A3
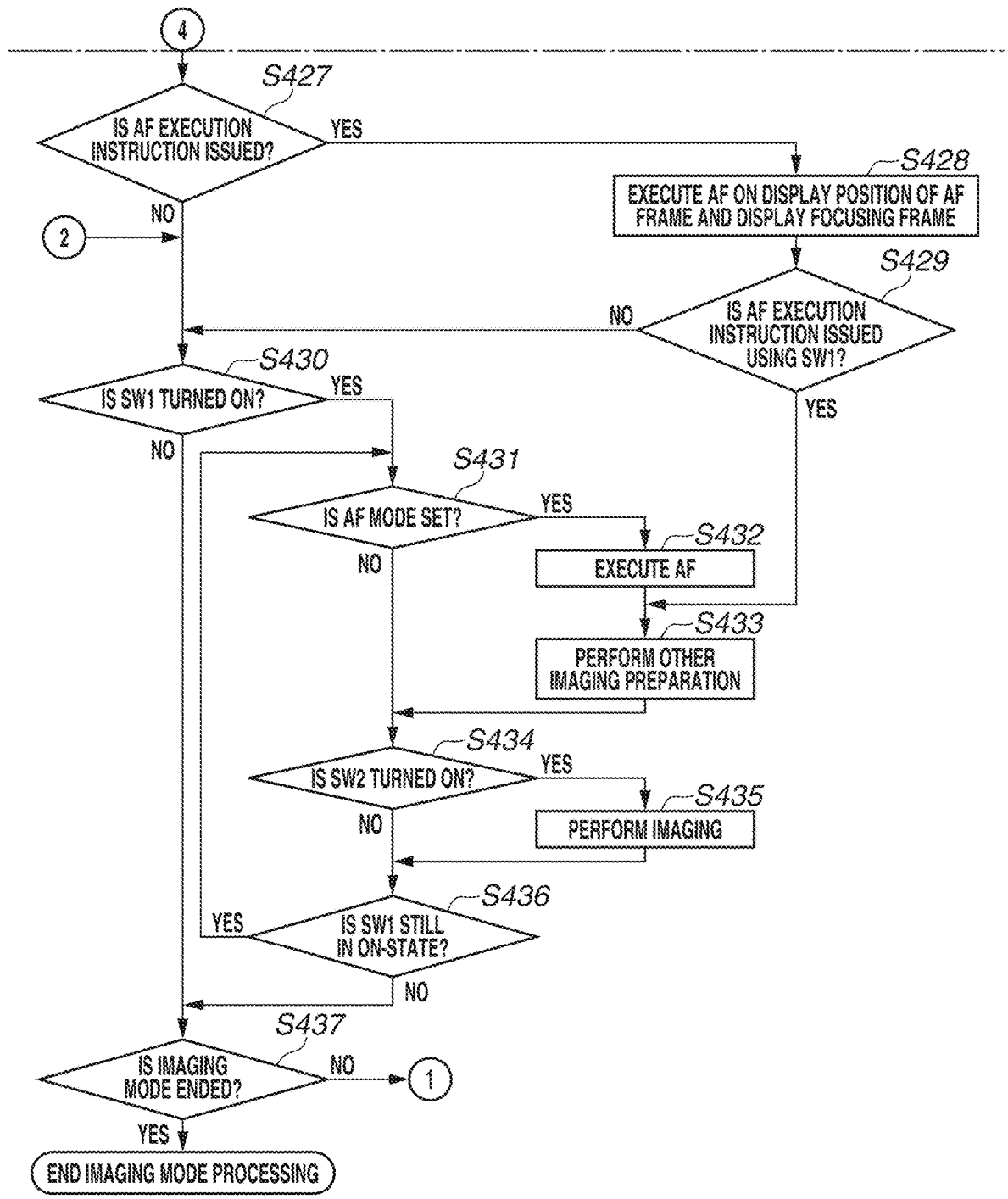

FIG.4B1
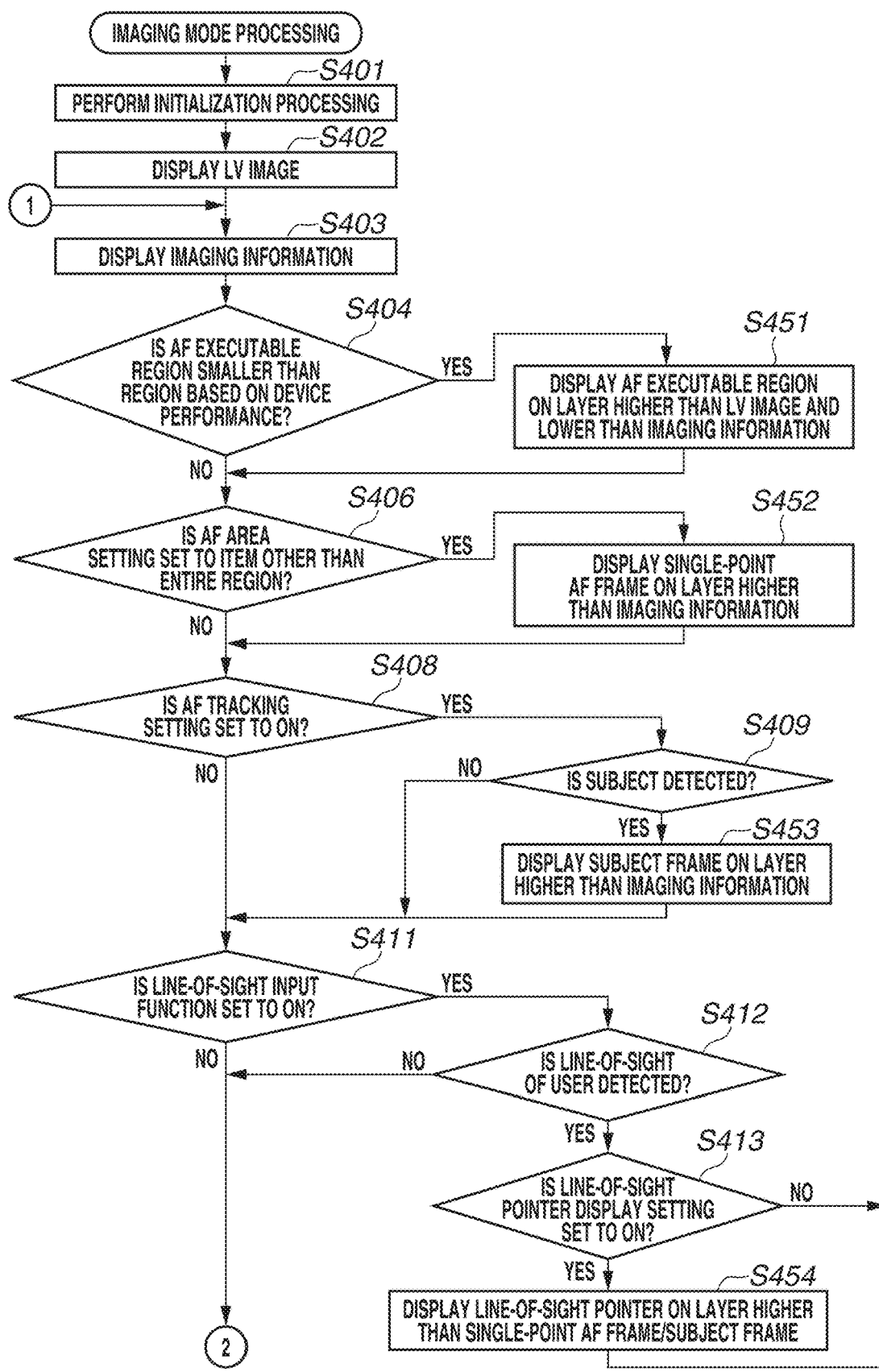

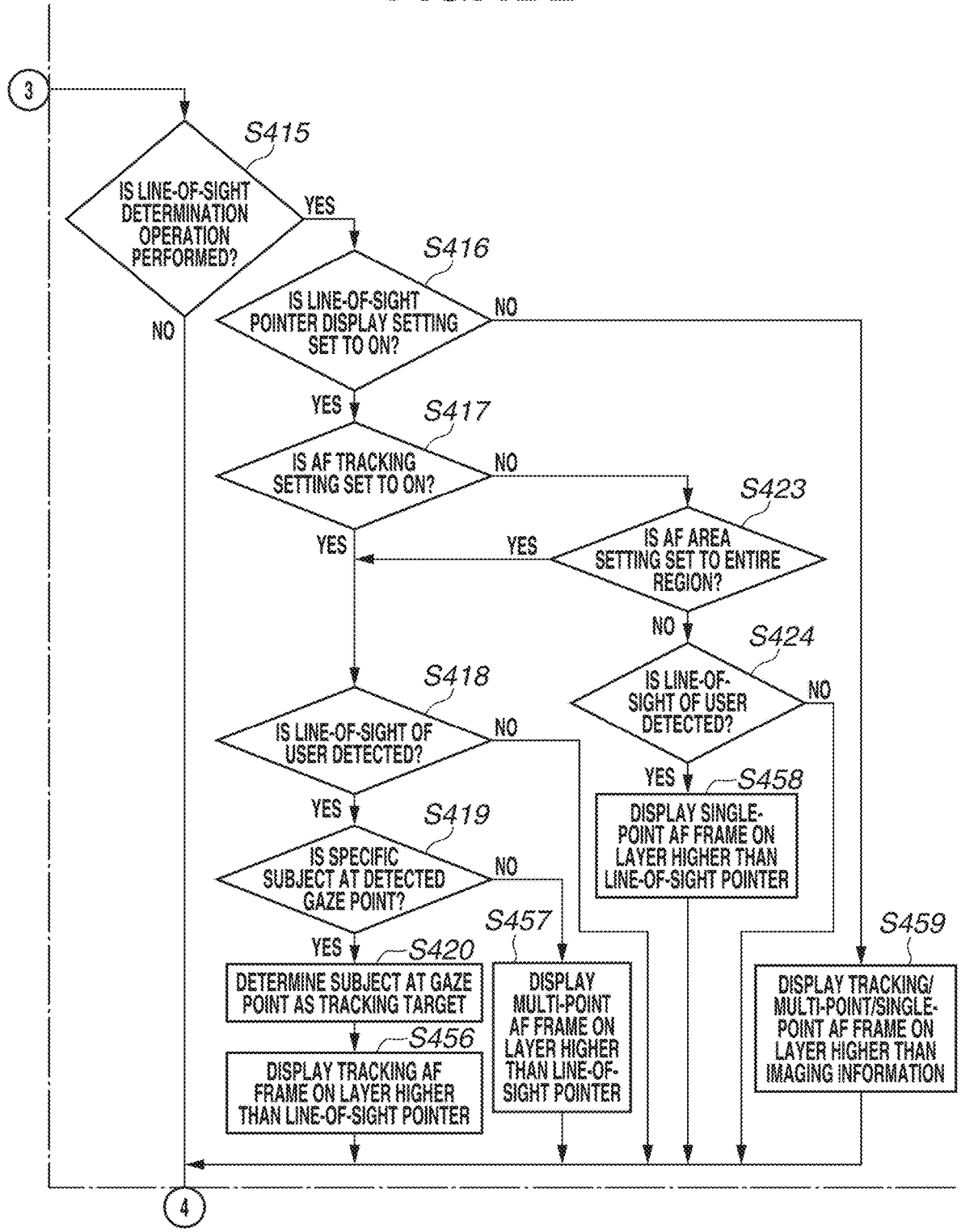
FIG.4B2

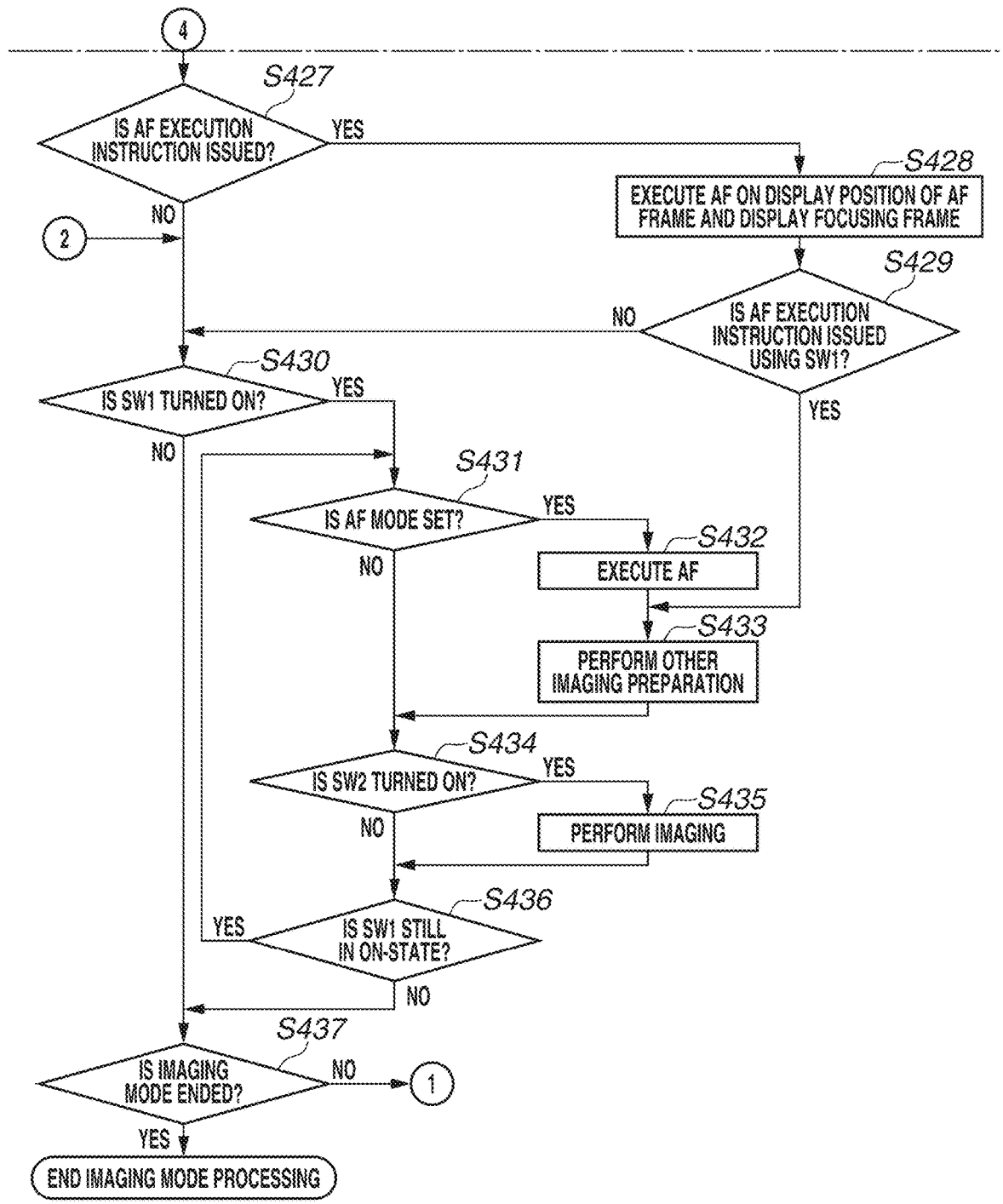
FIG.4B3

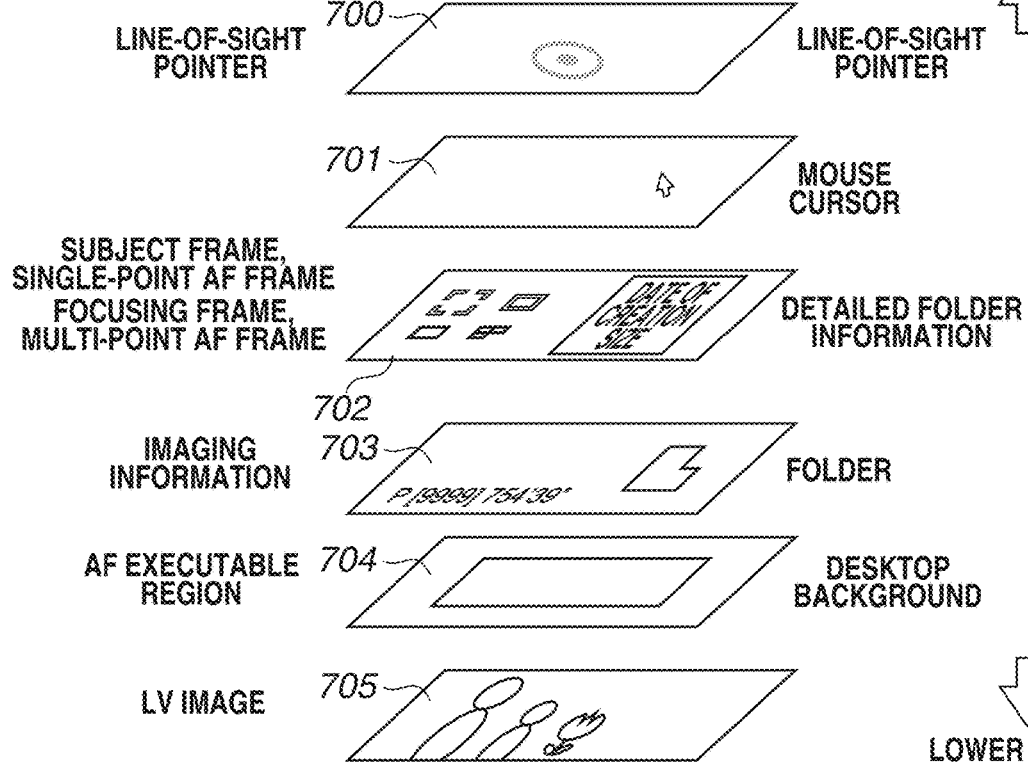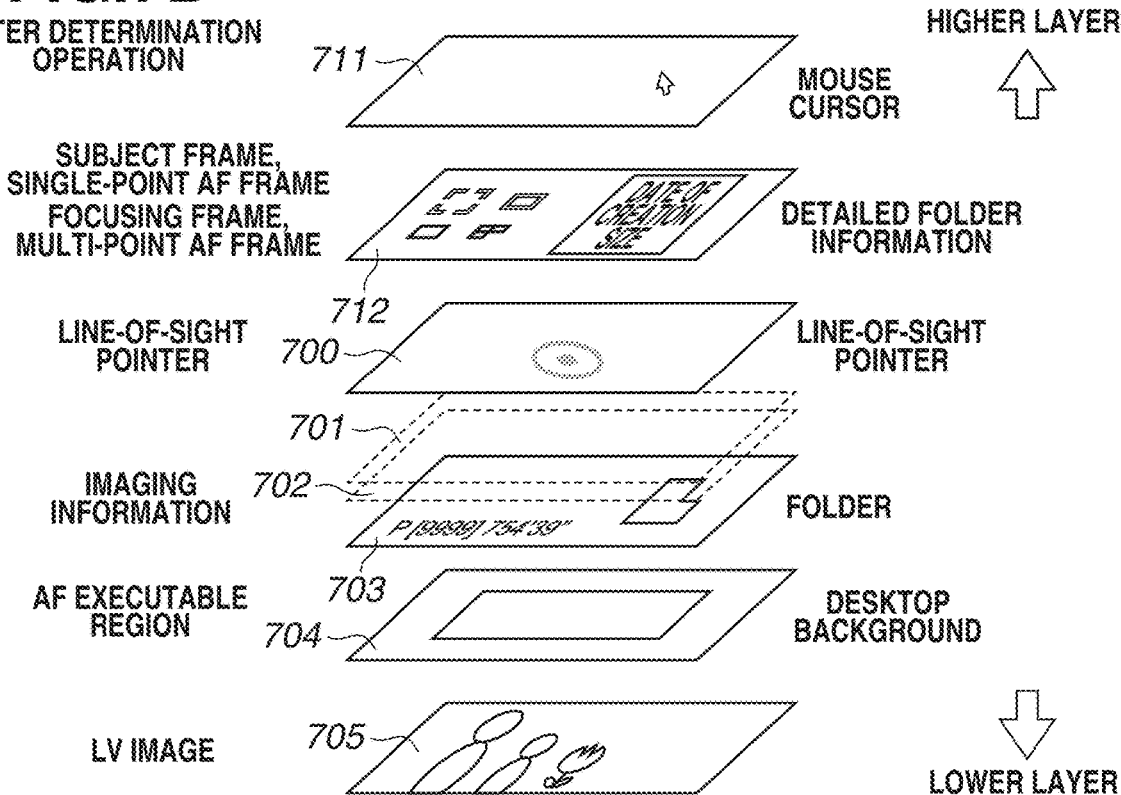

ELECTRONIC DEVICE, CONTROL METHOD THEREOF, AND RECORDING MEDIUM

BACKGROUND

Field

The present disclosure relates to an electronic device that is configured to detect a line-of-sight of a user and is operable by line-of-sight input, a method of controlling the electronic device, and a recording medium.

Description of the Related Art

In recent years, an electronic device that is operated based on a line-of-sight of a user (hereinafter, "line-of-sight input") is known. The line-of-sight input is effective especially in a case where the user wishes to input, to an electronic device (such as a digital camera or a game machine), an instruction to designate or move a desired position quickly. Japanese Patent Application Laid-Open No. 9-114846 discusses a technique by which an image similar to an image displayed at a gaze point calculated from a line-of-sight of a user is prioritized in display order. According to Japanese Patent Application Laid-Open No. 9-114846, if dedicated software is installed, a pointer can be displayed at a gaze point calculated from a line-of-sight of a user, and thus the user can view the gaze point of the user and a movement of the gaze point.

Since the technique discussed in Japanese Patent Application Laid-Open No. 9-114846 does not display the gaze point calculated from the line-of-sight of the user, it is not possible to check whether the gaze point corresponds to a position that the user is viewing. In a case where the gaze point does not correspond to the position that the user is viewing, similar images that are not intended by the user may be prioritized. According to Tobii Technology AB, "Streaming", Tobii Ghost Software, <https://gaming.tobii.com/software/ghost/> (searched the Internet on Oct. 7, 2020), a pointer indicating a gaze point is displayed. However, since the pointer is always displayed over any displayed objects, it is difficult to view a target displayed object, and consequently the user may feel annoyed with the pointer.

SUMMARY

The present disclosure is directed to a technique by which in performing an operation by line-of-sight input, a position (designated position) designated by a gaze point is easier to view after a determination operation is performed by a user than before the determination operation is performed.

According to various embodiments of the present disclosure, an electronic device includes a detection unit configured to detect a gaze point, which is based on line-of-sight of a user viewing, on a display unit, and a control unit configured to display an indicator on the display unit indicating the gaze point, wherein in a case where an operation is performed on an operation unit by the user, the control unit performs control to display a display item at the gaze point and to display the indicator and the display item in a changed display order.

Further features of the present disclosure will become apparent from the following description of example embodiments with reference to the attached drawings.

BRIEF DESCRIPTION OF THE DRAWINGS

FIG. 3 is a flowchart illustrating a process of controlling a digital camera according to an example embodiment of the present disclosure.

FIGS. 4A1 to 4A3 and 4B1 to 4B3 are flowcharts illustrating a process of controlling display of a line-of-sight pointer indicating a gaze point of a user and a frame in imaging mode processing according to an example embodiment of the present disclosure.

FIGS. 7A and 7B are diagrams illustrating a display order of objects displayed on a display unit according to an example embodiment of the present disclosure.

DESCRIPTION OF THE EMBODIMENTS

Various example embodiments of the present disclosure will be described in detail below with reference to the accompanying drawings.

It is to be noted that the following example embodiments are merely examples of implementations of the present invention and embodiments of the present disclosure can be appropriately modified or changed depending on individual constructions and various conditions of apparatuses to which the present invention is applied. Thus, the present invention is in no way limited to the following example embodiments.

<External View of Digital Camera 100>

Various example embodiments of the present disclosure will be described below with reference to the drawings.

Figure 1A:
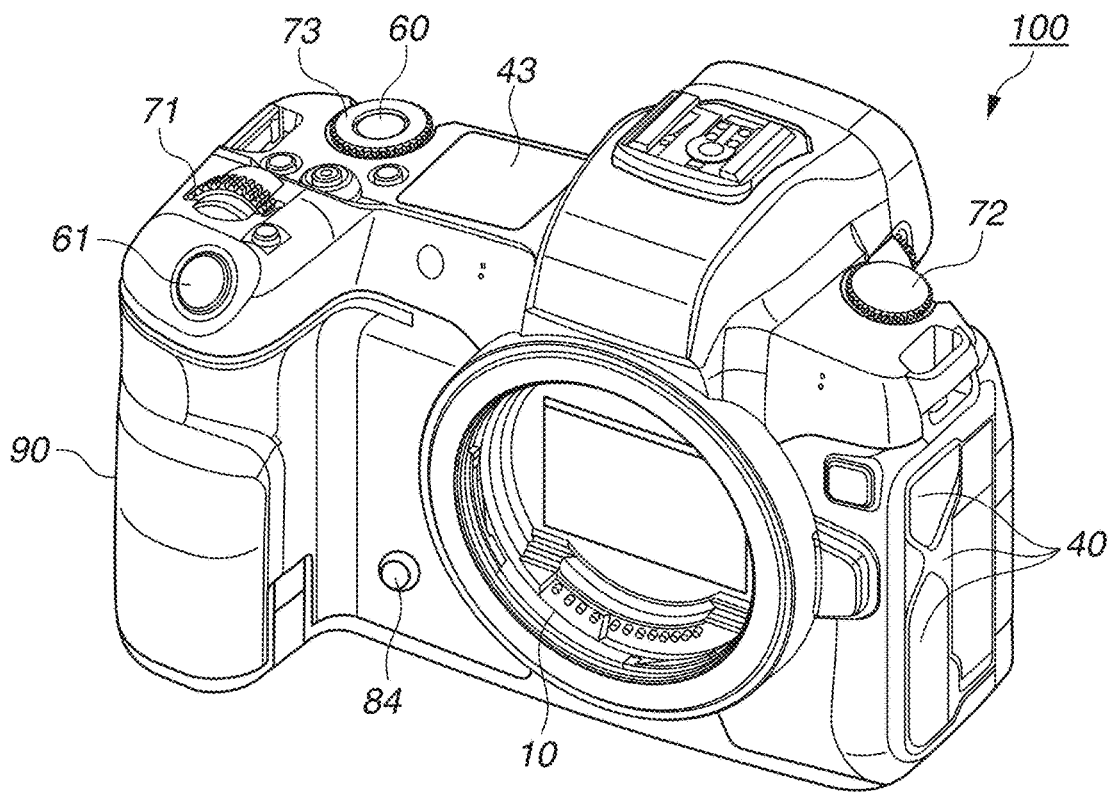
FIGS. 1A and 1B are external views illustrating a digital camera according to an example embodiment of the present disclosure.
Figure 1B:
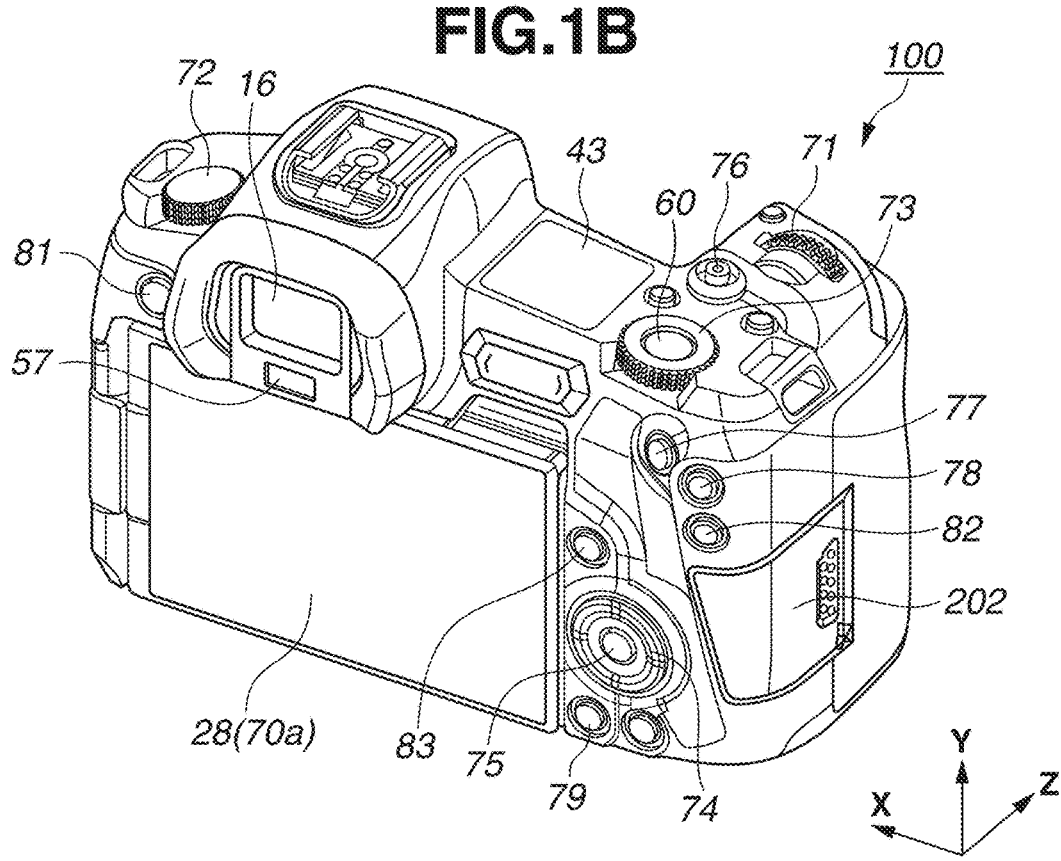

FIGS. 1A and 1B are external views illustrating a digital camera 100 as an example of an apparatus to which the present disclosure is applicable. FIG. 1A is a front perspective view illustrating the digital camera 100, and FIG. 1B is a rear perspective view illustrating the digital camera 100. In FIGS. 1A and 1B, a display unit 28 is a display unit that displays an image and various types of information and is provided to a rear surface of the digital camera 100. A touch panel 70a is an operation member on which a touch operation can be performed. The touch panel 70a detects a touch operation on a display surface (operation surface) of the display unit 28. An outside-finder display unit 43 is a display unit that is provided outside a finder of the digital camera 100 and displays various setting values of the digital camera 100, such as a shutter speed and an aperture.

A shutter button 61 is an operation unit for issuing an imaging instruction. A mode selection switch 60 is an operation unit for selecting various modes. A terminal cover 40 is a cover that protects a connector (not illustrated) for connecting a connection cable of an external device to the digital camera 100. A main electronic dial 71 is a rotary operation member of an operation unit 70, and setting values, such as the shutter speed and the aperture, are changed by rotating the main electronic dial 71. A power switch 72 is an operation member for turning on/off the digital camera 100. A sub-electronic dial 73 is a rotary operation member of the operation unit 70 for moving a selected frame and forwarding an image. A four-direction key 74 of the operation unit 70 is an operation member including a button that can be pressed in four directions, and an operation is performed based on a direction in which the four-direction key 74 is pressed. A SET button 75 is a button of the operation unit 70 and is used mainly to determine a selected item. A moving image button 76 is used to issue an instruction to start/stop imaging (recording) of a moving image. An auto-focus-on (AF-ON) button 77 of the operation unit 70 is pressed to start an auto-focus (AF) operation (automatic focal point adjustment). While the AF operation is started mainly in response to a press of the shutter button 61, an instruction to start an AF operation can be issued also by pressing the AF-ON button 77. In the digital camera 100 that can be set to not perform an AF operation in response to a press of the shutter button 61, an AF start instruction and an imaging instruction can be separately issued. By pressing the AF-ON button 77 and then pressing the shutter button 61, imaging is performed with the AF position fixed, or imaging is performed even under a situation where AF is inoperable. An auto-exposure (AE) lock button 78 of the operation unit 70 is pressed in an imaging standby state (state where image capturing is started in an imaging mode using an image capturing unit 22, preparation for imaging is not performed, and the digital camera 100 is waiting in the imaging mode), to fix an exposure state. Specifically, imaging is performed using a fixed user-desired exposure value. A reproduction button 79 of the operation unit 70 is an operation button for changing between the imaging mode and a reproduction mode. The reproduction button 79 is pressed during the imaging mode to change to the reproduction mode, and the display unit 28 displays the latest image among images recorded on a recording medium 200. A focusing button 84 of the operation unit 70 is pressed to focus a lens at an aperture value that is set at the time of the press of the focusing button 84 to check an in-focus range (depth of field). A menu button 81 of the operation unit 70 is pressed to display a menu screen to be used for various settings on the display unit 28. An enlargement button 82 of the operation unit 70 is an operation button for enabling or disabling an enlargement mode during a live view display in the imaging mode. A live-view image is enlarged or reduced by enabling the enlargement mode and then operating the main electronic dial 71. In the reproduction mode, the enlargement button 82 functions as an enlargement button that enlarges a reproduction image and increases an enlargement ratio. A multi-controller 83 is an operation member including a direction key and a button. The direction key can be operated in eight directions, and the button can be pressed. An operation based on a corresponding direction in which the multi-controller 83 is pushed is performed. A user can intuitively set various settings on the menu screen displayed on the display unit 28 using the four-direction key 74, the SET button 75, and the multi-controller 83. A framing assist button (not illustrated) is an operation button provided to a lens unit 150 or a lens adapter connecting the digital camera 100 to the lens unit 150. The framing assist button is an operation member disposed at a position where the user can press the framing assist button with the left hand of the user when holding a grip portion 90 with the right hand of the user and holding the lens unit 150 with the left hand of the user during imaging.

The operation unit 70 includes various operation members as an input unit for receiving user operations. The operation unit 70 includes a push button, a rotary dial, and a touch sensor and at least includes the shutter button 61, the touch panel 70a, the main electronic dial 71, the power switch 72, the sub-electronic dial 73, the four-direction key 74, the SET button 75, the moving image button 76, the AF-ON button 77, the AE lock button 78, the reproduction button 79, the menu button 81, the enlargement button 82, the multi-controller 83, the focusing button 84, and the framing assist button. A line-of-sight determination function is a function of updating an AF frame to a position based on a gaze point, and the digital camera 100 can include a dedicated button having the line-of-sight determination function, or the line-of-sight determination function can be assigned to an operation member having another function. Operation members to which the line-of-sight determination function can be assigned are the AF-ON button 77, the AE lock button 78, the push button of the multi-controller 83, the focusing button 84, and the framing assist button. The AF-ON button 77, the AE lock button 78, and the multi-controller 83 are disposed at a position operable by the user without disrupting imaging while the user operates the shutter button 61 with the forefinger of the right hand of the user. Specifically, when the user holds the grip portion 90 with the right hand of the user, the AF-ON button 77, the AE lock button 78, and the multi-controller 83 are on an upper side (side closer to the shutter button 61) of a central position on a rear surface portion of the digital camera 100, which is on the opposite side to the subject, and on the right hand side (side closer to the grip portion 90) of an electric viewfinder (EVF) 29. Operation members to which the line-of-sight determination function can be assigned are not limited to those provided to the rear surface portion of the digital camera 100 and can be any operation member that the user can operate while operating the shutter button 61. For example, the line-of-sight determination function can be assigned to an operation member that is provided to a front surface portion (subject side) or to the lens unit 150, such as the focusing button 84 or the framing assist button. In this case, the position of the operation member is not limited to the rear surface of the digital camera 100 and can be any position at which the operation member can be operated by the user with a finger other than the forefinger of the right hand operating the shutter button 61. An operation member to which the user can assign the line-of-sight determination function and that has another function is a button having a function not causing the digital camera 100 to change from the imaging mode when operated while the shutter button 61 is operated or a button having a function that does not disturb execution of an imaging function by an operation on the shutter button 61. Further, a button to which various functions can be assigned and that can be pressed can be employed. Alternatively, the function can be triggered in response to an operation performed on an operation bar operable rightward and leftward or a rotatable ring, or the touch panel 70a capable of detecting pressing force described below, instead of a button, is pressed with great pressure.

A communication terminal 10 is a communication terminal for communication of the digital camera 100 with the lens unit 150 (removable) described below. An eyepiece 16 is an eyepiece of a finder (view-through type finder), and the user can view a video image displayed on the EVF 29 of an inside-finder display unit through the eyepiece 16. An eye approach detection unit 57 is an eye detection sensor that detects whether an eye of a user capturing an image is put to the eyepiece 16. A cover 202 is a cover for a slot in which the recording medium 200 is stored. The grip portion 90 is a holding unit having a shape that is easy for the right hand of the user to hold when the user holds the digital camera 100. The shutter button 61 and the main electronic dial 71 are disposed at a position easily operable by the forefinger of the right hand of the user in a state where the user holds the digital camera 100 by holding the grip portion 90 with the little finger, the ring finger, and the middle finger of the right hand. Further, the sub-electronic dial 73 is disposed at a position operable by the thumb of the right hand in the foregoing state.

Figure 2:
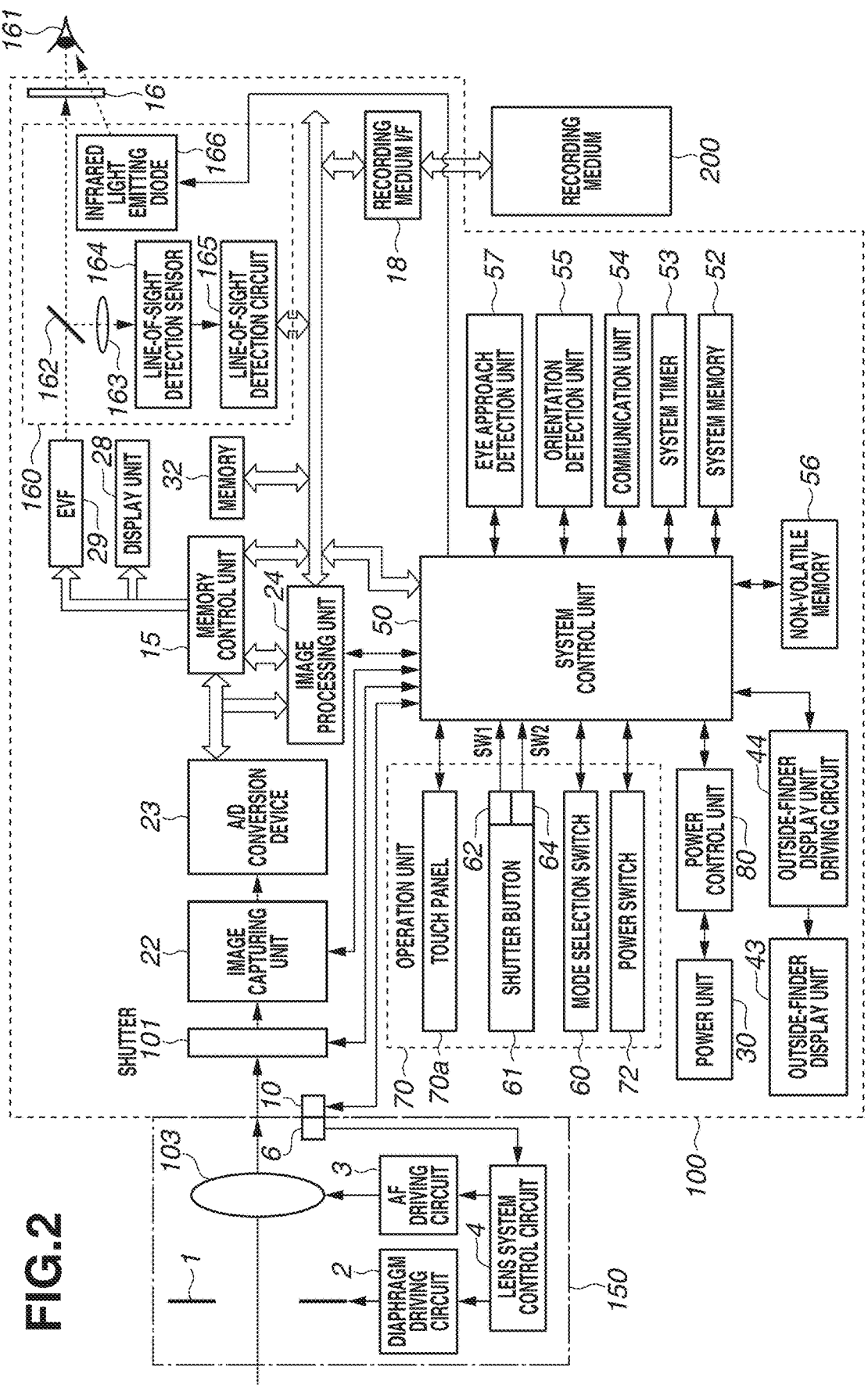
FIG. 2 is a block diagram illustrating a structure of a digital camera according to an example embodiment of the present disclosure.

FIG. 2 is a block diagram illustrating an example of a configuration of the digital camera 100 according to the present example embodiment. In FIG. 2, the lens unit 150 is a lens unit on which an interchangeable imaging lens is mounted. A lens 103 normally consists of a plurality of lenses but is illustrated simply as a single lens in FIG. 2. A communication terminal 6 is a communication terminal for communication of the lens unit 150 with the digital camera 100. The lens unit 150 communicates with a system control unit 50 via the communication terminal 6 and the communication terminal 10, and a lens system control circuit 4 in the lens unit 150 controls a diaphragm 1 via a diaphragm driving circuit 2. Then, the lens unit 150 adjusts a focal point of the lens 103 by displacing the lens 103 via an AF driving circuit 3.

A shutter 101 is a focal plane shutter that freely controls an exposure time of the image capturing unit 22 under control by the system control unit 50.

The image capturing unit 22 is an image sensor including a charge-coupled device (CCD) sensor or a complementary metal oxide semiconductor (CMOS) sensor and converts an optical image into an electric signal. An analog/digital (A/D) conversion device 23 is used to convert an analog signal output from the image capturing unit 22 into a digital signal.

An image processing unit 24 performs predetermined pixel interpolation, resizing processing, such as reduction, and color conversion processing on data from the A/D conversion device 23 or data from a memory control unit 15 described below. Further, the image processing unit 24 performs predetermined calculation processing using captured image data. Based on a calculation result acquired from the image processing unit 24, the system control unit 50 controls exposure and distance measurement. Consequently, through-the-lens (TTL) AF processing, AE processing, and flash with pre-emission (EF) processing are performed. The image processing unit 24 further performs predetermined calculation processing using captured image data and performs TTL automatic white balance (AWB) processing using an obtained result of the calculation.

The memory control unit 15 controls data transmission and reception between the A/D conversion device 23, the image processing unit 24, and a memory 32. Data output from the A/D conversion device 23 is written to the memory 32 via the image processing unit 24 and the memory control unit 15 or directly via the memory control unit 15. The memory 32 stores image data that is acquired by the image capturing unit 22 and then converted into digital data by the A/D conversion device 23 and image data to be displayed on the display unit 28 or the EVF 29. The memory 32 has sufficient capacity to store a predetermined number of still images and a predetermined time of moving images and audio.

The memory 32 is also used as a memory (video memory) for image display. Image data for display that is written to the memory 32 is displayed on the display unit 28 or the EVF 29 via the memory control unit 15. The display unit 28 and the EVF 29 perform display on a liquid crystal device (LCD) or an organic electroluminescent (EL) display, based on a signal from the memory control unit 15. Data converted from analog data into digital data by the A/D conversion device 23 and stored in the memory 32 is sequentially transferred to the display unit 28 or the EVF 29 and displayed to conduct live view display (LV display). Hereinafter, an image displayed in live view will be referred to as a live view image (LV image).

An infrared light emitting diode 166 is a light emitting element for detecting a line-of-sight of the user on a screen in the finder and emits infrared light to an eyeball (eye) 161 of the user. The infrared light emitted from the infrared light emitting diode 166 is reflected by the eyeball (eye) 161, and the reflected infrared light travels to a dichroic mirror 162. The dichroic mirror 162 reflects only infrared light and transmits visible light. The reflected infrared light having its optical path changed passes through an imaging lens 163 and forms an image on an image capturing surface of a line-of-sight detection sensor 164. The imaging lens 163 is an optical member of a line-of-sight detection optical system. The line-of-sight detection sensor 164 includes an image sensor, such as a CCD image sensor.

The line-of-sight detection sensor 164 photoelectrically converts incident reflected infrared light into an electric signal and outputs the electric signal to a line-of-sight detection circuit 165. The line-of-sight detection circuit 165 includes at least one processor. The line-of-sight detection circuit 165 detects the line-of-sight of the user from an image or movement of the eyeball (eye) 161 of the user, based on a signal output from the line-of-sight detection sensor 164 and outputs detected information to the system control unit 50. The dichroic mirror 162, the imaging lens 163, the line-of-sight detection sensor 164, the infrared light emitting diode 166, and the line-of-sight detection circuit 165 form a line-of-sight detection block 160. The line-of-sight detection block 160 is one of reception units that receive line-of-sight input.

In various embodiments of the present disclosure, a line-of-sight is detected by a corneal reflection method using the line-of-sight detection block 160. The corneal reflection method is a method that detects a direction of a line-of-sight of the user by detecting movement of the eye based on a relationship between infrared light emitted from the infrared light emitting diode 166 and reflected from the eyeball (eye) 161, especially the cornea, and a position of the pupil of the eyeball (eye) 161. There are various other line-of-sight detection methods, such as a scleral reflection method using a difference in light reflectance between black and white eyes. Any line-of-sight detection methods that can detect a line-of-sight other than those described above can also be employed.

The outside-finder display unit 43 displays various setting values of the digital camera 100 including a shutter speed and an aperture via an outside-finder display unit driving circuit 44.

A non-volatile memory 56 is an electrically erasable and programmable memory and uses, for example, a flash read-only memory (flash-ROM). The non-volatile memory 56 stores constant numbers for operation of the system control unit 50 and programs. The programs herein are programs for executing various flowcharts described below according to the present example embodiment.

The system control unit 50 is a control unit including at least one processor or circuit and controls the entire digital camera 100. The system control unit 50 executes the programs stored in the non-volatile memory 56 to realize below-described processing according to the present example embodiment. A system memory 52 is, for example, a random access memory (RAM), and the constant numbers and variable numbers for operation of the system control unit 50 and programs read from the non-volatile memory 56 are developed onto the system memory 52. Further, the system control unit 50 controls display by controlling the memory 32 and the display unit 28.

A system timer 53 is a time measurement unit that measures a time for use in various types of control and the time of a built-in clock.

The mode selection switch 60 is an operation member of the operation unit 70 and switches an operation mode of the system control unit 50 between a still image capturing mode and a moving image capturing mode. The still image capturing mode includes an automatic imaging mode, an automatic scene determination mode, a manual mode, an aperture priority mode (Av mode), a shutter speed priority mode (Tv mode), and a program AE mode (P mode). The still image capturing mode further includes various scene modes with different imaging settings each corresponding to a different imaging scene, a custom mode, and the like. The user can change the operation mode directly to any of the foregoing modes using the mode selection switch 60. Alternatively, the user uses the mode selection switch 60 to change to an imaging mode list screen, selects a mode from a plurality of displayed modes, and then uses another operation member to change the operation mode to the selected mode. Similarly, the moving image capturing mode can include a plurality of modes.

A first shutter switch 62 is turned on when the shutter button 61 of the digital camera 100 is operated halfway, i.e., half-pressed (imaging preparation instruction), and the first shutter switch 62 generates a first shutter switch signal SW1. Imaging preparation operations, such as AF processing, AE processing, AWB processing, and EF processing are started based on the first shutter switch signal SW1.

A second shutter switch 64 is turned on when the shutter button 61 is operated completely, i.e., fully pressed (imaging instruction), and the second shutter switch 64 generates a second shutter switch signal SW2. The system control unit 50 starts a series of image processing from reading of a signal from the image capturing unit 22 to writing of a captured image as an image file to the recording medium 200, based on the second shutter switch signal SW2. In a case where the second shutter switch 64 is continuously on, the digital camera 100 continuously captures an image (performs continuous imaging) at a speed that depends on a predetermined continuous imaging speed.

A power control unit 80 includes a battery detection circuit, a direct current (DC)-DC converter, and a switch circuit for changing a block to which a current is to be applied. The power control unit 80 detects attachment of a battery, a battery type, and a battery level. Further, the power control unit 80 controls the DC-DC converter, based on a result of the detection and an instruction from the system control unit 50 and feeds a predetermined voltage for a predetermined time to each component including the recording medium 200. A power unit 30 includes a primary battery, such as an alkali battery and a lithium battery, a second battery, such as a nickel-cadmium (NiCd) battery, a nickel metal hydride (NiMH) battery, and a lithium (Li) battery, and an alternating current (AC) adapter.

A recording medium interface (recording medium I/F) 18 is an interface with the recording medium 200, such as a memory card or a hard disk. The recording medium 200 is a recording medium, such as a memory card, that records captured images and includes a semiconductor memory or a magnetic disk.

A communication unit 54 is connected via a wireless or wired cable and transmits and receives video signals and audio signals. The communication unit 54 can also be connected to a wireless local area network (wireless LAN) and the Internet. Further, the communication unit 54 can communicate with an external device via Bluetooth® or Bluetooth® Low Energy. The communication unit 54 can transmit an image (including a live view image) captured by the image capturing unit 22 and an image recorded in the recording medium 200 and can receive images and various types of information from external devices.

An orientation detection unit 55 detects an orientation of the digital camera 100 with respect to the gravity direction. Whether an image captured by the image capturing unit 22 is an image captured with the digital camera 100 held horizontally or vertically is determined based on the orientation detected by the orientation detection unit 55. The system control unit 50 can add direction information based on the orientation detected by the orientation detection unit 55 to an image file of an image captured by the image capturing unit 22 and can rotate the image to record the rotated image. An acceleration sensor or a gyro sensor can be used as the orientation detection unit 55. A movement of the digital camera 100 (pan, tilt, lift, still state) can be detected using the acceleration sensor or the gyro sensor as the orientation detection unit 55.

The eye approach detection unit 57 is an eye proximity detection sensor that detects (approach detection) an approach (eye approach) or separation (eye separation) of the eye (object) 161 to or from the eyepiece 16 of the finder. The system control unit 50 switches the display unit 28 and the EVF 29 between displaying (display state) and non-displaying (non-display state), based on a state detected by the eye approach detection unit 57. More specifically, in a case where at least the digital camera 100 is in the imaging standby state and a display destination selection setting for a live view image captured by the image capturing unit 22 is set to an automatic selection setting, and when an eye approach is not detected, the display unit 28 is set as a display destination and the display on the display unit 28 is turned on while the display on the EVF 29 is set to a non-display state. When an eye approach is detected, the EVF 29 is set as a display destination, and the display on the EVF 29 is turned on while the display on the display unit 28 is set to a non-display state. The eye approach detection unit 57 can use, for example, an infrared ray proximity sensor and detects an object approach to the eyepiece 16 of the finder including the EVF 29 therein. In a case where an object approaches, an infrared ray projected from a light projecting unit (not illustrated) of the eye approach detection unit 57 is reflected, and a reflected infrared ray is received by a light receiving unit (not illustrated) of the infrared ray proximity sensor. Based on the amount of received infrared ray, a distance of the approaching object from the eyepiece 16 (approaching eye distance) is also determined. The eye approach detection unit 57 performs approaching eye detection to detect an object approaching the eyepiece 16 as described above. According to the present example embodiment, the light projecting unit and the light receiving unit of the eye approach detection unit 57 are devices disposed separately from the infrared light emitting diode 166 and the line-of-sight detection sensor 164. Alternatively, the infrared light emitting diode 166 can be also used as the light projecting unit of the eye approach detection unit 57. Further, the line-of-sight detection sensor 164 can be also used as the light receiving unit. In a case where an approaching object is detected within a predetermined distance from the eyepiece 16 in a state where the eye 161 is not in the proximity (non-approach state), it is determined that the eye 161 is in the proximity. In a case where a detected approaching object is separated by a predetermined distance or longer in the state where the eye 161 is in the proximity (approach state), it is determined that the eye 161 is separated. A threshold value for eye approach detection and a threshold value for eye separation detection can be set differently by, for example, providing hysteresis. Further, after an eye approach is detected, the approach state continues until an eye separation is detected. After an eye separation is detected, the non-approach state continues until an eye approach is detected. The infrared ray proximity sensor is a mere example, and a different sensor that detects an approach of an eye or object as an eye approach can be employed as the eye approach detection unit 57.

The system control unit 50 performs one of the operations or states described below based on output from the line-of-sight detection block 160.

A state where a line-of-sight of a user having an eye approaching the eyepiece 16 is detected by the line-of-sight detection block 160, i.e., a state where a line-of-sight input is received.

A state where a line-of-sight of a user having an eye approaching the eyepiece 16 is detected by the line-of-sight detection block 160 and the user is gazing (described below).

A state where a line-of-sight of a user having an eye approaching the eyepiece 16 is detected by the line-of-sight detection block 160 and thereafter the line-of-sight is no longer detected, i.e., a state where a line-of-sight input ends.

A state where a line-of-sight of a user having an eye approaching the eyepiece 16 is not detected by the line-of-sight detection block 160, i.e., a state where a line-of-sight input is not received.

The state where "the user is gazing" refers to a state where the line-of-sight detection block 160 identifies a position (gaze point) on the EVF 29, based on a detected line-of-sight and determines that the amount of movement of the identified gaze point does not exceed a predetermined amount within a predetermined time. Specifically, the gaze point refers to a position on the EVF 29 (on a display unit) that is determined as being viewed by the user.

The state where "a line-of-sight input ends" is a case where the eye 161 of the user is separated from the eyepiece 16 or a case where the eye 161 remains in the proximity of the eyepiece 16 but is not detected because the eyelid is closed.

The touch panel 70a and the display unit 28 can be integrated together. For example, the touch panel 70a is configured in such a manner that the light transmittance does not disturb the display on the display unit 28, and the touch panel 70a is attached to an upper layer of a display surface of the display unit 28. Input coordinates on the touch panel 70a are associated with display coordinates on a display screen of the display unit 28. This provides a display object (graphical user interface) that looks as though the user can directly operate the screen displayed on the display unit 28. The system control unit 50 detects one of the operations described below on the touch panel 70a or one of the states described below.

A finger or a pen that is previously not in touch with the touch panel 70a touches the touch panel 70a. Specifically, a touch starts (hereinafter, referred to as "touch-down").

A state where the touch panel 70a is being touched with a finger or a pen (hereinafter, referred to as "touch-on").

A state where a finger or a pen touching the touch panel 70a is moved (hereinafter, referred to as "touch-move").

A finger or a pen touching the touch panel 70a is separated. Specifically, the touch ends (hereinafter, referred to as "touch-up").

A state where the touch panel 70a is not touched (hereinafter, referred to as "touch-off").

In a case where a touch-down is detected, a touch-on is simultaneously detected. After the touch-down, unless a touch-up is detected, a touch-on is normally detected continuously. A state where a touch-move is detected is also a state where a touch-on is detected. Even if a touch-on is detected, unless the touch position is not moved, a touch-move is not detected. After a touch-up of all the touched fingers or a pen is detected, the state is changed to a touch-off.

The foregoing operations or states and coordinates of a position touched with a finger or a pen on the touch panel 70a are notified to the system control unit 50 via an internal bus. The system control unit 50 determines which operation (touch operation) is performed on the touch panel 70a, based on the notified information. As to a touch-move, a movement direction of a finger or a pen moving on the touch panel 70a can be determined for each vertical component and each horizontal component on the touch panel 70a, based on a change in the position coordinates. In a case where a touch-move of a predetermined distance or greater is detected, it is determined that a slide operation is performed. An operation of suddenly moving a finger touching the touch panel 70a by a distance and then releasing the finger is referred to as "flick". In other words, a flick is an operation of quickly sliding a finger on the touch panel 70a in a similar way to flipping the surface of the touch panel 70a. In a case where a touch-move of a predetermined distance or greater at a predetermined speed or higher is detected followed by detection of a touch-up, it is determined that a flick is performed (it is determined that a flick is performed following a slide operation). Further, a touch operation of simultaneously touching a plurality of positions (e.g., two points) and bringing the touched positions closer to each other will be referred to as "pinch-in" and a touch operation of bringing the touched positions away from each other as "pinch-out". The pinch-out and the pinch-in will collectively be referred to as "pinch operation" (or simply "pinch"). The touch panel 70a can be a touch panel of any of various methods, such as a resistive film method, a capacitance method, a surface acoustic wave method, an infrared method, an electromagnetic induction method, an image recognition method, and an optical sensor method. Some methods detect a touch based on a touch on a touch panel while some other methods detect a touch based on an approach of a finger or a pen to a touch panel, but any of the methods can be employed.

Figure 5A:
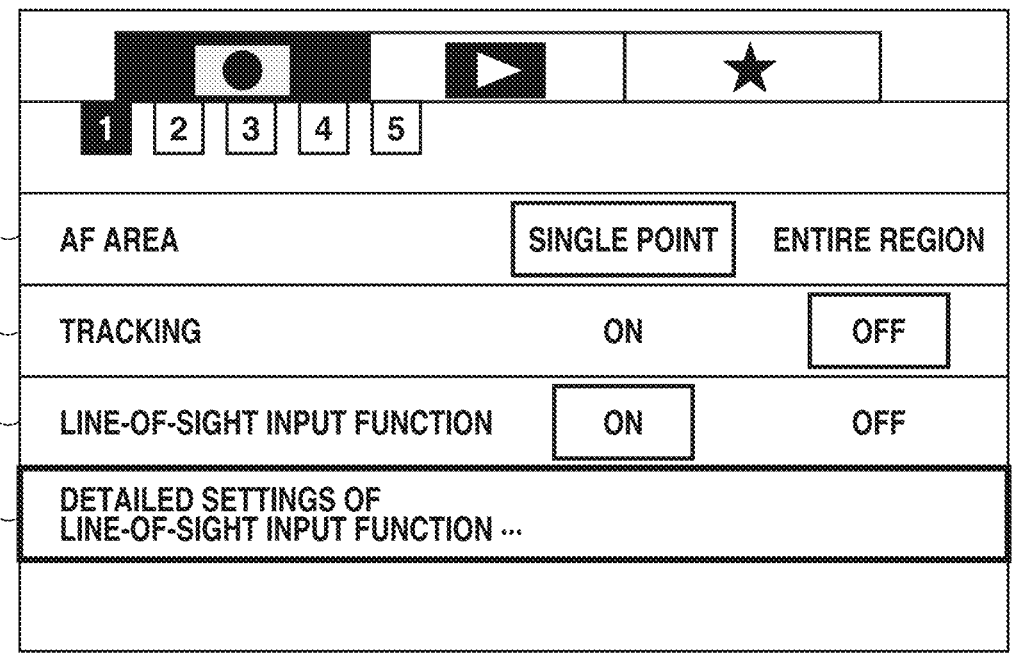
FIGS. 5A and 5B are setting menu screens according to an example embodiment of the present disclosure.

Settings such as those that are illustrated as items 501 and 502 in FIG. 5A are set as AF settings. One of "single-point AF" and "entire-region AF" is set as an AF area (AF frame setting method) setting as illustrated in the item 501. The single-point AF setting indicates that an AF execution target position in a LV image is a single point (one position). The user can set a single point as an AF execution target position, and AF is executed at the display position of a single-point AF frame that is displayed based on a user instruction to execute AF. For example, in imaging a train running toward the user, the user may wish to execute AF on an operator seat of the train and to capture an image of the train with a composition including the entire train. In this case, imaging is performed with the AF frame fixed at the single point (one position) at the moment at which the operator seat of the train reaches the position, whereby an image focused on the user-desired position with the user-desired composition is acquired. On the other hand, the entire-region AF setting illustrated in the item 502 is a setting that enables AF execution (enables focal point detection) on an entire AF executable region of a region displayed on the EVF 29 of the digital camera 100. In imaging a subject with unpredictable movement, the AF area setting is set to the entire region, to execute AF on a subject regardless of where the subject is in the AF executable region.

One of tracking settings "ON" and "OFF" is set as an AF operation setting as illustrated in the item 502 in FIG. 5A. The tracking function set to "ON" is suitable for imaging in a situation where a tracking target is a subject with a continuously-changing (moving) imaging distance, such as an athlete in competition, a moving child, or an animal. Tracking and continuous AF are executed on an AF target subject determined using an element condition. The continuous AF refers to continuous execution of AF on a tracking target subject.

The tracking function set to "OFF" is suitable for imaging of a still subject, and an AF frame position is determined based on an element condition (priority) described below at the time when the first shutter switch 62 is on. At this time, the subject is not tracked.

In a case where the tracking function is set to "ON", if a face of a person is detected from a LV image, the face is preferentially determined as an AF target subject. In a case where a plurality of faces of persons is detected, one face is selected based on one of the below predetermined priority levels (conditions), for example, and is set as an AF target subject.

The face is a face of the detected person.
The size of the face is large.
The position of the face is close to the digital camera 100 (nearer side).
The position of the face is close to the center of the image.
The face is a face of a pre-registered person.

In a case where a face of a person is not detected, a subject other than a face is selected based on one of the following predetermined priority levels (conditions), for example, and set as an AF target subject.

A subject close to the digital camera 100 (nearer side).
A subject with a high contrast.
A subject with high priority, such as an animal or a vehicle.
A subject that is a moving object.

In a case where a tracking target subject is designated by the user, the tracking target subject is set as an AF target subject. Specifically, weighting is conducted using at least one element condition among the element conditions described above as priority examples of the two groups, and a subject with an obtained score higher than or equal to a predetermined threshold or a subject with the highest score is determined as an AF target subject.

There are four patterns of combinations of settings of the items 501 and 502 that can be set as the AF settings. The user uses different settings for different imaging target subjects or imaging situations, to set optimum imaging settings for the user, whereby imaging is performed at a desired timing with a desired composition.

In FIG. 5A, the AF area is set to "single-point" AF, and the tracking is set to "OFF". This indicates that the user wishes to fix the AF frame to a single point. This combination of settings often improves user operability in, for example, imaging a still subject, such as a flower.

FIG. 5A illustrates an example of a setting menu screen. Whether to detect a line-of-sight of the user, i.e., whether to drive the line-of-sight detection block 160, is selected by switching a line-of-sight input function of an item 503 between "ON" and "OFF". Specifically, whether to receive an operation by line-of-sight input is set by switching the line-of-sight input function of the item 503 between "ON" and "OFF".

Figure 5B:
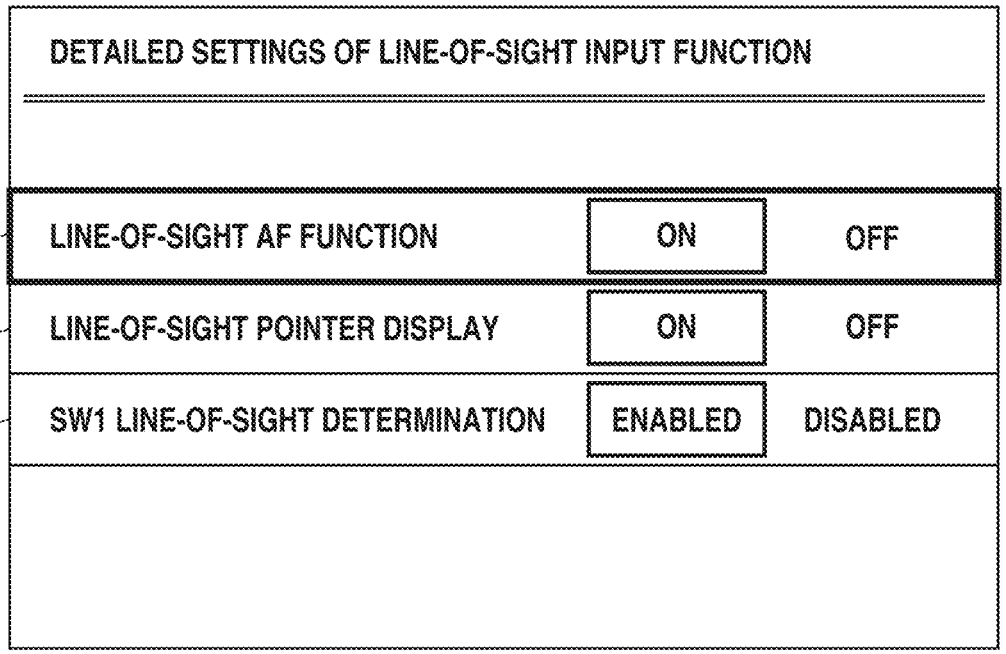

In a case where the user selects an item 504, the screen is changed to a screen (screen of the bottom layer of the setting menu screen in FIG. 5A) as illustrated in FIG. 5B. FIG. 5B illustrates a screen on which detailed settings of a line-of-sight AF function can be set. The line-of-sight AF function of an item 505 is a function of executing AF to focus on a subject displayed at a gaze point. In a case where the item 505 is set to "ON", a subject is identified based on a movement of a line-of-sight of the user, and AF is executed on an identified subject, and accordingly the user can intuitively execute AF on a desired subject. An item 506 is a setting item about whether to display a line-of-sight pointer at a gaze point. In a case where the item 506 is set to "ON", the user can view display of the line-of-sight pointer indicating a gaze point which is detected by the line-of-sight detection block 160 based on a direction viewed by the eye of the user. According to the present example embodiment, the line-of-sight pointer is displayed as an indicator as illustrated as a pointer 606 in FIG. 6D. A small circle centered at the gaze point is displayed, and a larger circle than the small circle is displayed around the small circle. In FIG. 6D, the small circle of the pointer 606 is displayed with its inside portion being shaded, whereas the larger circle is displayed with its frame being shaded. Each of the shaded portions is translucent to prevent the subject from becoming completely invisible when the shaded portions are superimposed over the subject or the AF frame in the LV image. Further, similarly, since the region between the small circle and the frame of the larger circle is not shaded, the visibility of the LV image is not lost.

An item 507 is a setting item about whether to use an operation of turning on the first shutter switch (SW1) 62, i.e., an operation of half-pressing the shutter button 61, as an operation (line-of-sight determination operation) of determining a gaze point. In a case where the item 507 is enabled, a point detected by the line-of-sight detection block 160 when the shutter button 61 is half-pressed by the user is determined as a gaze point. In a case where the item 507 is disabled, half-pressing the shutter button 61 does not determine the gaze point.

For example, the line-of-sight determination function is assigned to the AF-ON button 77 at the time of initial setting (at the time of shipment from factory). In a case where the item 507 is set to "enabled", a line-of-sight determination operation is performed in a case where not the AF-ON button 77 but the shutter button 61 is pressed to turn on the first shutter switch 62. Further, similarly, the line-of-sight determination operation can be assigned to a button of the operation unit 70 to which another function is assigned. A case where a gaze point determined using another button is different from a gaze point at the half-press of the shutter button 61 in a case where the user half-presses the shutter button 61 after determining the gaze point using the button of another function will be discussed below as an example. In this case, since the gaze point at the half-press of the shutter button 61 may be determined to cause AF execution on a subject at this gaze point, which is different from the user-desired gaze point determined using the button of the other function, operability is inferior. Thus, the item 507 on the setting menu screen is provided to allow the user to set whether to determine a gaze point by turning on the first shutter switch (SW1) 62.

The control according to a first example embodiment will be described below with reference to flowcharts illustrated in FIGS. 3 and 4A. According to the first example embodiment, in step S302 (imaging mode processing) in FIG. 3, frames (items) such as the single-point AF frame and a subject frame that are displayed before a line-of-sight determination operation by the user are displayed at a gaze point as a result of the line-of-sight determination operation.

FIG. 3 is a flowchart illustrating a control process by the digital camera 100 according to the present example embodiment. The control process is realized by the system control unit 50 by developing a program stored in the non-volatile memory 56 onto the system memory 52 and executing the developed program. The flowchart in FIG. 3 is started in a case where the digital camera 100 is turned on (activated). The flowchart in FIGS. 4A1 to 4A3 is started in a case where imaging mode processing is to be executed (YES in step S301) in the flowchart in FIG. 3. Further, FIGS. 6A to 6J are diagrams illustrating an example of a display on the EVF 29 in a case where the control process illustrated in the flowchart in FIG. 3 is performed. FIGS. 6A to 6I are diagrams illustrating an example of a display in a case where the AF area setting of the item 501 in FIG. 5A is set to "single point" and the tracking function setting of the item 502 is set to "ON". FIG. 6J is a diagram illustrating an example of a display in a case where the AF area setting is set to "entire region" and the tracking function is set to "OFF".

In step S301, the system control unit 50 determines whether the imaging mode is set. In a case where the imaging mode is set (YES in step S301), the processing proceeds to step S302. In a case where the imaging mode is not set (NO in step S301), the processing proceeds to step S303.

In step S302, the system control unit 50 performs imaging mode processing. The imaging mode processing will be described below with reference to FIGS. 4A1 to 4A3.

In step S303, the system control unit 50 determines whether the reproduction mode is set. In a case where the reproduction mode is set (YES in step S303), the processing proceeds to step S304. In a case where the reproduction mode is not set (NO in step S303), the processing proceeds to step S305.

In step S304, the system control unit 50 performs reproduction mode processing. The reproduction mode processing is control processing for reproducing a captured image, and an image reproduced on the display unit 28 can be forwarded or enlarged by operating the operation unit 70.

In step S305, the system control unit 50 performs other processing based on the determinations in steps S301 and S303. The other processing is, for example, processing of making settings about the digital camera 100 and imaging on the setting menu screen.

In step S306, the system control unit 50 determines whether the processing is ended. In a case where the processing is ended (YES in step S306), the control process illustrated in the flowchart in FIG. 3 ends. In a case where the processing is not ended (NO in step S306), the processing returns to step S301. To end the processing refers to, for example, to turn off the digital camera 100.

FIGS. 4A1 to 4A3 are flowcharts illustrating the imaging mode processing described above as step S302 in FIG. 3. The processing procedure of the flowcharts is started in a case where it is determined that the imaging mode is set in step S301 in FIG. 3 (YES in step S301 in FIG. 3).

In step S401, the system control unit 50 initializes flags and control variable numbers.

Figure 6A:
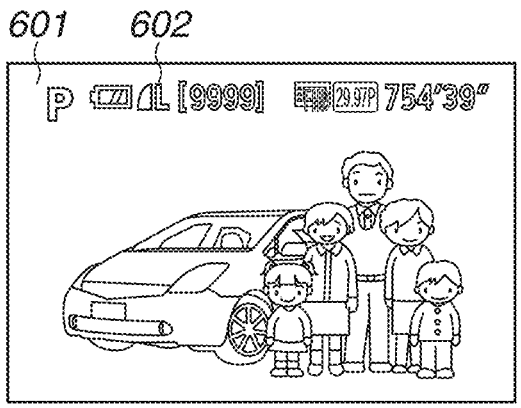
FIGS. 6A to 6J are diagrams each illustrating a display example of a line-of-sight pointer indicating a gaze point of a user and a frame according to an example embodiment of the present disclosure.

In step S402, the system control unit 50 displays a LV image 601 on the EVF 29 as illustrated in FIG. 6A, based on a signal acquired via the image capturing unit 22. A LV image display layer is a layer 705 as illustrated in FIGS. 7A and 7B. Specifically, the LV image 601 is displayed on the layer that is lowest in position (lowest in priority level) among those displayed on the EVF 29 according to the present example embodiment.

In step S403, the system control unit 50 displays various types of imaging information (imaging parameter) about the imaging mode processing, such as various setting values, the battery level, and the number of recording pixels. As illustrated in FIG. 6A, information 602 is displayed with the LV image 601 on the EVF 29. Imaging information, such as the information 602 is displayed on a layer higher than the LV image display layer, as illustrated as a layer 703 in FIG. 7A.

In step S404, the system control unit 50 determines whether a region on which AF is executable (hereinafter, "AF executable region") is smaller than a region that depends on a main body of the digital camera 100. In a case where the AF executable region is smaller (YES in step S404), the processing proceeds to step S405. In a case where the AF executable region is not smaller (NO step S404), the processing proceeds to step S406. The AF executable region is uniquely defined based on performance of the main body of the digital camera 100, but depending on the type of the lens unit 150 mounted on the digital camera 100, the AF executable region may become smaller than an AF executable region that is based on the performance of the main body of the digital camera 100. There is a case where an AF executable region smaller than the AF executable region that is based on the performance of the main body of the digital camera 100 is set in a case where a specific lens, such as a super-telephoto single focus lens, is mounted because a sufficient amount of light for AF execution may not be obtained with a super-telephoto single focus lens in a region near the periphery of the lens. Thus, in a case where such a lens is mounted as the lens unit 150 on the digital camera 100, an AF executable region smaller than the region that depends on the main body of the digital camera 100 is set. Although the user may be aware of the AF executable region that depends on the main body of the digital camera 100, since the user may use various types of lenses in imaging, when the user changes a lens mounted on the digital camera 100, the user may not be aware of a range of an AF executable region that depends on the currently mounted lens. This can lead to a situation where the AF executable region that is based on the performance of the digital camera 100 is the entire EVF 29 but the AF executable region is reduced as a result of mounting a specific lens, and this may confuse the user. Unless the user visually recognizes the reduced AF region, the user may not realize that AF is not executable on a specific area, and the user may miss an imaging opportunity. In order to prevent the opportunity losses, the AF executable region determination is performed in step S404, and in subsequent step S405, the AF executable region is displayed. According to the present example embodiment, the AF executable region that depends on the main body of the digital camera 100 is the entire EVF 29 (vertical-horizontal ratio: 100%×100%).

In step S405, the system control unit 50 displays an indicator indicating the AF executable region. Since the result of the determination in step S404 is "YES", it is understood that a specific lens that causes the AF executable region to become smaller than the AF executable region that depends on the main body of the digital camera 100 is mounted. Thus, AF is executable only on the smaller region than the entire region of the EVF 29. In order to notify the user of this situation, the AF executable region is superimposed and displayed over the LV image. The AF executable region is displayed to be visually recognized by the user as illustrated as a frame 603 in FIG. 6B. The display form is not limited to the frame display such as the frame 603 and can be a display form having a region outside the AF executable region shaded in gray.

In step S406, the system control unit 50 determines whether the AF area setting is set to the item other than "entire region". As described above with reference to FIGS. 5A and 5B, the AF area setting is to set whether to set an entire region or a single point as an area to execute AF. In a case where the AF area setting is set to the item other than "entire region", i.e., single point (YES in step S406), the processing proceeds to step S407, whereas in a case where the AF area setting is set to "entire region" (NO in step S406), the processing proceeds to step S408.

Figure 6B:
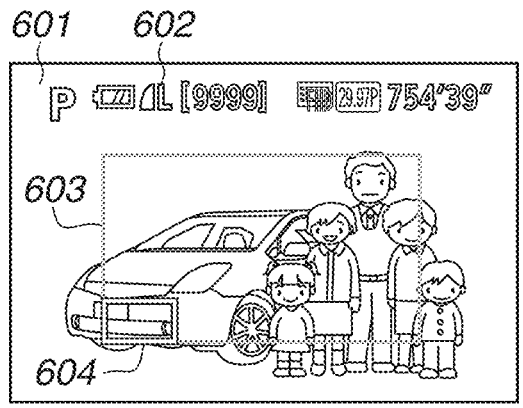

In step S407, the system control unit 50 displays the single-point AF frame. A frame 604 in FIG. 6B is an example of the display. The single-point AF frame can be moved to a user-desired position by operating a direction key of the four-direction key 74.

In step S408, the system control unit 50 determines whether the AF tracking setting is set to "ON". In a case where the tracking setting is set to "ON" (YES in step S408), the processing proceeds to step S409, whereas in a case where the tracking setting is set to "OFF" (NO in step S408), the processing proceeds to step S411.

In step S409, the system control unit 50 determines whether a subject is detected from the LV image acquired via the image capturing unit 22. In a case where a subject is detected (YES in step S409), the processing proceeds to step S410, whereas in a case where a subject is not detected (NO in step S409), the processing proceeds to step S411. The subject detection refers to detection of, for example, a face, a body, or an organ, such as an eye of a person. A subject is not limited to a person, and an animal, a bird, or a vehicle can be detected.

Figure 6C:
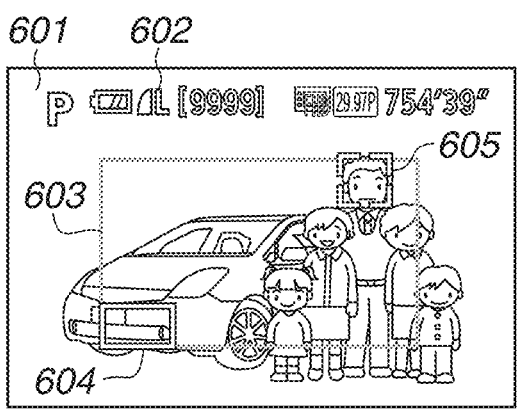
Figure 6D:
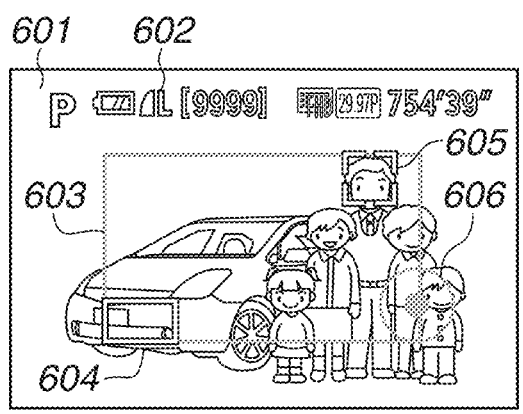

In step S410, the system control unit 50 displays the subject frame over the subject detected in step S409. A frame 605 in FIG. 6C is an example of the display. Since the result of the determination in step S408 is "YES", the user may attempt to capture an image of a moving subject. Thus, the subject frame is displayed over the subject detected in the LV image by the system control unit 50, whereby the subject frame indicates the detection of the subject and the user can visually recognize the subject with ease. According to the present example embodiment, a display form of the subject frame includes an angled bracket at each of the four corners of the position of the detected subject to surround the region where the subject is detected.

In step S411, the system control unit 50 determines whether the line-of-sight input function is set to "ON". In a case where the line-of-sight input function is set to "ON" (YES in step S411), the processing proceeds to step S412, whereas in a case where the line-of-sight input function is set to "OFF" (NO in step S411), the processing proceeds to step S430. As described above, the line-of-sight input function is set as desired by the user on the setting menu screen. The line-of-sight input function can be switched between "ON" and "OFF" at a press of a dedicated button for switching the line-of-sight input function or at a press of a button to which the line-of-sight input function can be assigned, without changing to the setting menu screen.

In step S412, the system control unit 50 determines whether a line-of-sight of the user is detected using the line-of-sight detection block 160. In a case where a line-of-sight is detected (YES in step S412), the processing proceeds to step S413, whereas in a case where a line-of-sight is not detected (NO in step S412), the processing proceeds to step S430. According to the present example embodiment, a line-of-sight of the user is not detected in a case where the eye of the user is not in the proximity of the eyepiece 16.

In step S413, the system control unit 50 determines whether the line-of-sight pointer display setting for the line-of-sight pointer indicating a gaze point is set to "ON". In a case where the line-of-sight pointer display setting is set to "ON" (YES in step S413), the processing proceeds to step S414, whereas in a case where the line-of-sight pointer display setting is set to "OFF" (NO in step S413), the processing proceeds to step S415.

Figure 6E:
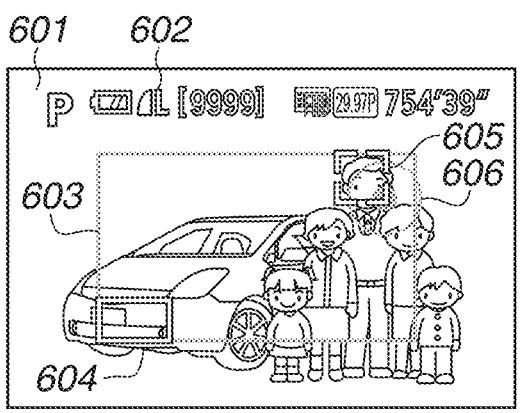

In step S414, the system control unit 50 displays the line-of-sight pointer at the detected gaze point. The pointer 606 in FIG. 6D is an example of the display. In FIG. 6D, the frame 605 is displayed over the detected subject, and the frame 604 indicating a single-point AF frame is displayed. The user is viewing the display position of the pointer 606 near the lower right of the LV image 601. FIG. 6E illustrates an example of a display in a case where the area the user is viewing is changed to cause the gaze point to move to a position near the display position of the frame 605. The line-of-sight pointer 606 is displayed on a display layer lower than the frame 604.

In step S415, the system control unit 50 determines whether a line-of-sight determination operation is performed by the user. In a case where a line-of-sight determination operation is performed (YES in step S415), the processing proceeds to step S416, whereas in a case where a line-of-sight determination operation is not performed (NO in step S415), the processing proceeds to step S427. The line-of-sight determination operation refers to an operation on the dedicated button having the line-of-sight determination function or on the button to which the line-of-sight determination function is assigned. The line-of-sight determination function refers to a function of determining a gaze point detected at the time of a line-of-sight determination operation and invalidating a line-of-sight of the user that is detected after the determination and a gaze point calculated based on the line-of-sight detected after the determination. Displaying a frame display (item), such as the AF frame, following a detected gaze point on the EVF 29 may cause the user to feel annoyed. Even in a case where a line-of-sight is unintentionally moved by the user, since the moved line-of-sight is followed by the frame display (item), such as the AF frame, processing such as AF may be executed on an unintended position. Thus, before a line-of-sight determination operation is performed, the frame display is not moved to the gaze point and remains displayed at or over the position/subject determined based on the AF area setting, the tracking setting, and the priority described above, and in a case where a line-of-sight determination operation is performed, the frame display is moved to the gaze point and displayed at the gaze point. Since the AF frame is moved from a position to the gaze point and displayed at the gaze point based on the line-of-sight determination operation, even in a case where the AF frame position that is currently displayed on the EVF 29 and the user-desired position (gaze point) are at a great distance from each other, the AF frame is moved quickly and intuitively. Further, the user intention is accurately read and reflected based on the line-of-sight determination operation by the user. Thus, control such as AF execution is not conducted at a gaze point that is not intended by the user.

In a case where the frame display before a line-of-sight determination operation is disabled (e.g., the AF area setting is set to "entire-region" and the tracking setting is set to "OFF"), display is controlled to display the frame display at a determined gaze point in a case where a line-of-sight determination operation is performed.

In step S416, as in step S413, the system control unit 50 determines whether the line-of-sight pointer display setting is set to "ON". In a case where the line-of-sight pointer display setting is set to "ON" (YES in step S416), the processing proceeds to step S417, whereas in a case where the line-of-sight pointer display setting is set to "OFF" (NO in step S416), the processing proceeds to step S426.

In step S417, as in step S408, the system control unit 50 determines whether the AF tracking setting is set to "ON". In a case where the AF tracking setting is set to "ON" (YES in step S417), the processing proceeds to step S418, whereas in a case where the AF tracking setting is set to "OFF" (NO in step S417), the processing proceeds to step S423.

In step S418, as in step S412, the system control unit 50 determines whether a line-of-sight of the user is detected using the line-of-sight detection block 160. In a case where a line-of-sight is detected (YES in step S418), the processing proceeds to step S419, whereas in a case where a line-of-sight is not detected (NO in step S418), the processing proceeds to step S427.

In step S419, the system control unit 50 determines whether a specific subject is at the gaze point detected in the LV image in step S418. In a case where a specific subject is at the detected gaze point (YES in step S419), the processing proceeds to step S420, whereas in a case where a specific subject is not at the detected gaze point (NO in step S419), the processing proceeds to step S422.

In step S420, the system control unit 50 determines the subject determined as being at the gaze point in step S419 as a tracking target and executes continues AF on the tracking target subject. At this time, even if the gaze point does not exactly coincide with the position of the subject, in a case where the gaze point is detected within a predetermined range from the subject, it is determined that the gaze point is over the subject, and AF on the tracking target subject is continued.

Figure 6F:
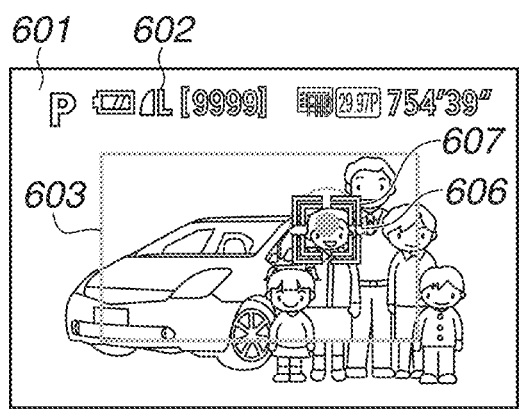

In step S421, a tracking AF frame for the subject determined as a tracking target in step S420 is superimposed and displayed over the line-of-sight pointer 606. A frame 607 in FIG. 6F is an example of the display. The tracking AF frame is an AF frame indicating a position of execution of continuous AF on the subject that is determined based on the above-described element condition. The display form of the tracking AF frame includes a double angled bracket at each of the four corners of the position of execution of continuous AF to surround the region of the tracking target subject. In a case where the determination result is "YES" in step S415, i.e., the line-of-sight determination operation is performed by the user, the tracking AF frame is displayed in a display form different from the frame (subject frame) 605 and the frame (AF frame) 604 that are displayed before the line-of-sight determination operation is performed. This enables the user to recognize that the tracking target subject is determined by the line-of-sight determination operation performed by the user and to clearly and visually recognize the subject determined as a tracking target. The subject frame is a mere display for notifying the user whether a specific subject (e.g., the face of a person) is in the LV image displayed on the EVF 29 (whether a subject is detected), and in a case where a plurality of subjects is detected, a plurality of subject frames is displayed. On the contrary, a plurality of tracking AF frames is not displayed in the LV image (one tracking AF frame is displayed), and the display of the tracking AF frame indicates that the subject at the display position of the tracking AF frame is to be focused at a press of the shutter button 61. In other words, the subject frame displayed in step S410 and the tracking AF frame displayed in step S421 are different in nature. The subject frame is displayed over a subject recognized as a specific subject in the LV image by the system control unit 50 but does not indicate that the subject is an AF execution target candidate. AF is not executed at the display position of the subject frame. On the contrary, the tracking AF frame indicates that the subject is recognized as a specific subject by the system control unit 50 and is an AF execution target. Further, continuous AF is executed at the display position of the tracking AF frame. Specifically, from the point of view of the importance for recognition of an AF execution target by the user, the tracking AF frame is more important for the user. Thus, since the tracking AF frame is displayed over the gaze point (the position where the line-of-sight is detected) of the user by a line-of-sight determination operation, the tracking AF frame is quickly moved to a desired position at a user-desired timing.

In step S422, the system control unit 50 displays a multi-point AF frame at the display position of the line-of-sight pointer, i.e., the gaze point detected based on the line-of-sight of the user. The multi-point AF frame is an AF frame that is displayed at a position with the highest score obtained in determination based on the element condition in a case where a subject is not detected in the LV image displayed on the EVF 29. The display form of the multi-point AF frame is a small rectangle displayed at the position with the high obtained score as illustrated as a frame 610 in FIG. 6J. In a case where the multi-point AF frame is displayed as in step S422, frames such as the AF frame and the subject frame are not displayed in the LV image before the line-of-sight determination operation is performed in step S415. Specifically, the multi-point AF frame is displayed as a frame display after the line-of-sight determination operation is performed. The multi-point AF frame is displayed on a display layer higher than the display layer of the line-of-sight pointer. Since the multi-point AF frame is displayed as described above, the user can visually check that AF is to be executed on the subject over which the multi-point AF frame is displayed in a case where an AF execution instruction is issued. Thus, the user can determine a next operation, such as an operation to issue an AF execution instruction immediately, an operation to change the position of the AF frame, or an operation to change the composition or the imaging settings.

In step S423, the system control unit 50 determines whether the AF area setting is set to "entire region". In a case where the AF area setting is set to "entire region" (YES in step S423), the processing returns to step S418, whereas in a case where the AF area setting is not set to "entire region", i.e., the AF area setting is set to "single point" (NO in step S423), the processing proceeds to step S424.

In step S424, as in steps S412 and S418, the system control unit 50 determines whether a line-of-sight of the user is detected using the line-of-sight detection block 160. In a case where a line-of-sight is detected (YES in step S424), the processing proceeds to step S425, whereas in a case where a line-of-sight is not detected (NO in step S424), the processing proceeds to step S427.

In step S425, the system control unit 50 moves the single-point AF frame to the display position of the line-of-sight pointer, i.e., the gaze point. The single-point AF frame is a frame that indicates the position of a single point to be focused in a case where an AF execution instruction is issued. The single-point AF frame is displayed in a display form such as the display form of the frame 604 in FIG. 6B. In a case where the line-of-sight determination operation is performed by the user, the single-point AF frame is moved from the display position set before the line-of-sight determination operation, to the gaze point. Thus, even in a case where the display position before the line-of-sight determination operation is at a great distance from the gaze point, the single-point AF frame is quickly moved. Thus, an imaging opportunity loss is reduced and an image focused on a user-desired subject is captured and recorded. The single-point AF frame is displayed on a display layer higher than the display layer of the line-of-sight pointer 606.

In step S426, the system control unit 50 displays a frame display such as the tracking AF frame, the multi-point AF frame, or the single-point AF frame at the gaze point, based on the details of the settings of the items 501 and 502. Since the result of the determination in step S416 is "NO", the line-of-sight pointer is not displayed on the EVF 29. However, since the results of the determinations in steps S411 and S412 are both "YES", the line-of-sight of the user is detected using the line-of-sight detection block 160. As in steps S421, S422, and S425, even in a case where the display position of the frame before the line-of-sight determination operation is performed is at a great distance from the gaze point, the AF frame is quickly moved. Further, even in a case where frames are not displayed before the line-of-sight determination operation is performed, since the AF frame is quickly displayed at the gaze point, the position of the AF frame is intuitively determined.

In step S427, the system control unit 50 determines whether an AF execution instruction is issued. In a case where an AF execution instruction is issued (YES in step S427), the processing proceeds to step S428, whereas in a case where an AF execution instruction is not issued (NO in step S427), the processing proceeds to step S430. The AF execution instruction is issued by, for example, pressing the AF-ON button 77 or turning on the first shutter switch 62. The AF execution instruction is not limited to those described above and can be an instruction by an operation to which the function of issuing an instruction to execute AF is assigned.

Figure 6G:
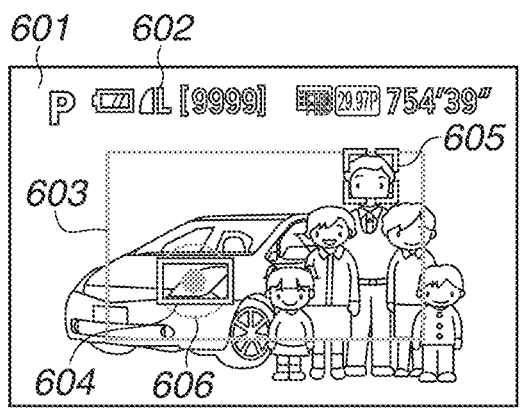
Figure 6H:
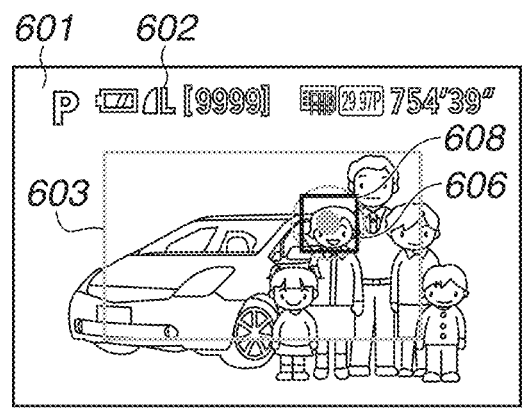
Figure 6I:
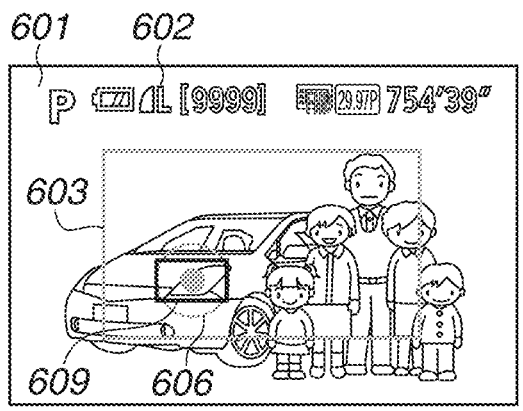
Figure 6J:
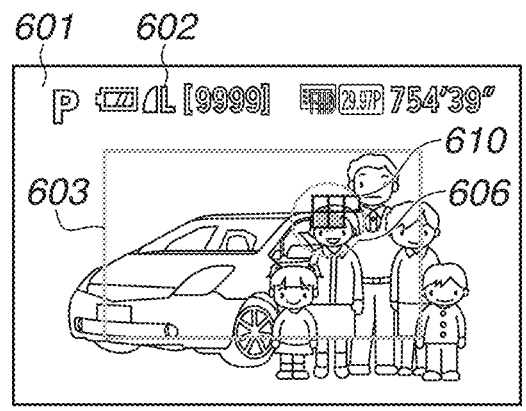

In step S428, the system control unit 50 executes AF on the subject at the display position of the AF frame displayed over the LV image on the EVF 29. An example of the display is illustrated in FIG. 6H. FIG. 6H is an example of the display in a case where an AF execution instruction is issued in the state illustrated in FIG. 6F (YES in step S427). In a case where AF is executed on the subject at the AF frame based on the AF execution instruction, the display form of the AF frame is changed from the display form of the frame 607 in FIG. 6F to a display form of a frame 608 in FIG. 6H based on a focusing result. At this time, in a case where the line-of-sight pointer display setting is enabled, the frame 608 is displayed on a display layer higher than the display layer of the line-of-sight pointer. Further, in a case where the AF execution instruction in step S427 is issued at the display position of the frame 604 that is the single-point AF frame displayed as illustrated in FIG. 6G in step S425, AF is executed on the subject under the frame 604. Then, the display form of the single-point AF frame is changed from the display form of the frame 604 in FIG. 6G to a display form of a frame 609 in FIG. 6I based on the focusing result. The display form of the AF frame is changed from the state set before AF execution or based on the focusing result (focusing is successful and focusing is unsuccessful) to notify the user of the focus position and the focusing result. Specifically, AF is executed on the subject at the display position of the AF frame, and in a case where the focusing is successful, the frame 608 in FIG. 6H is displayed in green, whereas in a case where the focusing is unsuccessful, the frame 608 is displayed in gray. Further, in a case where the focusing is successful, a beeping sound is produced, whereas in a case where the focusing is unsuccessful, no sound is produced. In a case where an AF execution instruction is issued when the AF area setting is set to "entire region" and the tracking function setting is set to "OFF", the multi-point AF frame is displayed in the display form of the frame 610 in FIG. 6J. The display form of the frame 610 is displayed after an AF execution instruction is issued by the user, and the frame display is not performed before an AF execution instruction is issued. Specifically, in a case where the AF area setting is set to "entire region" and the tracking function setting is set to "OFF", the AF frame display is not performed before an AF execution instruction is issued by the user.

In step S429, the system control unit 50 determines whether the AF execution instruction determined in step S427 is issued using the first shutter switch 62. In a case where the determined AF execution instruction is issued using the first shutter switch 62 (YES in step S429), the processing proceeds to step S433. Otherwise (NO in step S429), the processing proceeds to step S430.

In step S430, the system control unit 50 determines whether the first shutter switch 62 is turned on. In a case where the first shutter switch 62 is turned on (YES in step S430), the processing proceeds to step S431. In a case where the first shutter switch 62 is not turned on (NO in step S430), the processing proceeds to step S437. The state where the first shutter switch 62 is turned on refers to the state where the shutter button 61 is half-pressed as described above. Specifically, the user is expected to perform imaging.

In step S431, the system control unit 50 determines whether a focus mode is set to an AF mode. In a case where the focus mode is set to the AF mode (YES in step S431), the processing proceeds to step S432. Otherwise (in a case where the focus mode is set to a manual focus (MF) mode) (NO in step S431), the processing proceeds to step S434. The AF mode and the MF mode are switched via the setting menu screen or using a switch provided outside the lens unit 150.

In step S432, as in step S428, the system control unit 50 executes AF processing based on the display position of the AF frame.

In step S433, the system control unit 50 performs other imaging preparation processing, such as AE and AWB.

In step S434, the system control unit 50 determines whether the second shutter switch 64 is turned on. In a case where the second shutter switch 64 is turned on, i.e., the shutter button 61 is fully pressed (YES in step S434), the processing proceeds to step S435. Otherwise (NO in step S434), the processing proceeds to step S436.

In step S435, the system control unit 50 performs a series of imaging processing up to recording of a captured image as an image file in the recording medium 200.

In step S436, the system control unit 50 determines whether the first shutter switch 62 is still in the on-state. In a case where the first shutter switch 62 is still in the on-state (YES in step S436), the processing returns to step S431, whereas in a case where the first shutter switch 62 is no longer in the on-state (NO in step S436), the processing proceeds to step S437.

In step S437, the system control unit 50 determines whether the imaging mode is ended. In a case where the imaging mode is ended (YES in step S437), the control flowchart in FIGS. 4A1 to 4A3 is ended, and the processing returns to step S306 in FIG. 3. On the other hand, in a case where the imaging mode is not ended (NO in step S437), the processing returns to step S403. The imaging mode is ended by, for example, turning off the digital camera 100 or pressing the menu button 81 to change to the setting menu screen.

As described above, according to the first example embodiment, in a case where an operation can be performed by line-of-sight input, the AF frame is moved to a gaze point and displayed at the gaze point in a case where a line-of-sight determination operation is performed by the user. Since AF frame tracking following movement of a line-of-sight of the user is not performed before the line-of-sight determination operation, the position of the AF frame is not moved to follow movement of the gaze point that is not intended by the user. Thus, the user is less likely to feel annoyed while checking the LV image. Further, even in a case where the display position of the AF frame before the line-of-sight determination operation is at a great distance from a user-desired position, when the user performs a line-of-sight determination operation with a line-of-sight directed toward a desired position, the AF frame can be quickly moved to the gaze point. Further, since a frame display such as the AF frame is displayed on a display layer higher than the display layer of the line-of-sight pointer in displaying the line-of-sight pointer at the gaze point, the user can clearly recognize a position of the AF frame and also can easily recognize movement of the position of the AF frame moved to a position toward which the line-of-sight is directed.

Second Example Embodiment

A case where a display order of a frame display that is a display object such as the tracking AF frame, the multi-point AF frame, or the single-point AF frame and the line-of-sight pointer indicating a gaze point is changed before and after the line-of-sight determination operation in step S302 (imaging mode processing) in FIG. 3 according to a second example embodiment will be described below. The control according to the second example embodiment will be described below with reference to FIG. 3 and a control flowchart in FIGS. 4B1 to 4B3. FIG. 3 is similar to that in the first example embodiment. The flowchart in FIGS. 4B1 to 4B3 is started in the case of the imaging mode processing in the flowchart in FIG. 3 (the case where the result of the determination in step S301 is "YES"). Redundant descriptions of steps in the flowchart in FIGS. 4B1 to 4B3 that are similar to those in FIGS. 4A1 to 4A3 according to the first example embodiment are omitted in the second example embodiment.

In step S404, in a case where the AF executable region is smaller than the region that depends on the main body of the digital camera 100 (YES in step S404), the processing proceeds to step S451. In step S451 according to the present example embodiment, the system control unit 50 displays the AF executable region (the frame 603 in FIG. 6B) on a layer higher than the LV image and lower than the imaging information. Specifically, as illustrated in FIG. 7A, the AF executable region is displayed on a layer 704 higher than the layer 705 of the LV image and lower than the layer 703 of the imaging information.

In step S452, the system control unit 50 displays the single-point AF frame (the frame 604 in FIG. 6B) on a layer higher than the imaging information (imaging parameter). Specifically, as illustrated in FIG. 7A, the single-point AF frame is displayed on a layer 702 higher than the layer 703 of the imaging information.

In step S453, the system control unit 50 displays the subject frame (the frame 605 in FIG. 6C) over the subject detected in step S409. At this time, the subject frame is displayed on a layer higher than the imaging information. Specifically, as illustrated in FIG. 7A, the subject frame is displayed on the layer 702 higher than the layer 703 of the imaging information, similarly to the single-point AF frame.

In step S454, the system control unit 50 displays the line-of-sight pointer indicating the gaze point on a layer higher than the frame display, such as the single-point AF frame or the subject frame. Specifically, as illustrated in FIG. 7A, the line-of-sight pointer is displayed on a layer 700 higher than the layer 702. Similarly, even in a case where the gaze point is moved as a result of changing a viewing direction by the user, the line-of-sight pointer is displayed on a layer higher than the frame display.

Specifically, before the line-of-sight determination operation is performed by the user in step S415, the line-of-sight pointer is displayed on a layer higher than the frame display such as the single-point AF frame or the subject frame.

According to the present example embodiment, in addition to setting the line-of-sight input function to "ON" or "OFF", the user can set also the line-of-sight pointer display setting to "ON" or "OFF". Thus, in a case where the line-of-sight pointer display setting of the item 506 in FIG. 5B is enabled, it can be considered that the user wishes a viewing direction of the user to be detected to view the line-of-sight pointer indicating the gaze point identified based on the detected viewing direction. Thus, before a line-of-sight determination operation is performed and the frame display is moved, the display of the line-of-sight pointer is prioritized and displayed on a layer higher than the frame display. Further, the line-of-sight pointer according to the present example embodiment is displayed in the display form allowing the user to check the LV image even in a state where the line-of-sight pointer is superimposed and displayed over the LV image as described above. Thus, even in a case where the line-of-sight pointer is displayed on a layer higher than the frame display, the line-of-sight pointer is less likely to completely hide the display position of the frame display and is less likely to prevent imaging preparation.

In step S456, the tracking AF frame is displayed over the tracking target subject determined in step S420. Since this is after the line-of-sight determination operation is performed (YES in step S415), the tracking AF frame is displayed on a layer 712 higher than the layer 700 of the line-of-sight pointer as illustrated in FIG. 7B. Specifically, according to the present example embodiment, before the line-of-sight determination operation is performed by the user in step S415, the frame display is displayed on a layer lower than the line-of-sight pointer (the frame display is displayed on the layer 702 in FIG. 7A). On the contrary, after the line-of-sight determination operation is performed by the user in step S415, the frame display is displayed on a layer higher than the line-of-sight pointer (the frame display is displayed on the layer 712 in FIG. 7B).

In a case where the user performs a line-of-sight determination operation, it can be considered that the user sufficiently recognizes the gaze point corresponding to the viewing direction of the user and, furthermore, wishes to move (shift) the frame display to the gaze point and display the frame display at the gaze point. Further, the display position of the frame display such as the single-point AF frame or the subject frame is a position that is highly important and the user should check before executing an imaging instruction. Thus, the frame display that is displayed and moved based on the line-of-sight determination operation is displayed on a layer higher than the line-of-sight pointer. This makes it easy for the user to view the frame display moved by a line-of-sight determination operation and, for example, to recognize a subject that is to be an AF target in a case where an AF execution instruction is issued.

In step S457, the system control unit 50 moves the multi-point AF frame to the detected gaze point based on the determination result "NO" in step S419. At this time, the multi-point AF frame is displayed on a layer higher than the line-of-sight pointer. Similarly to the tracking AF frame in step S456, the multi-point AF frame is also displayed on a layer higher than the line-of-sight pointer. Specifically, as illustrated in FIG. 7B, the multi-point AF frame is displayed on the layer 712 higher than the layer 700 of the line-of-sight pointer.

In step S458, the system control unit 50 moves the single-point AF frame which is displayed on a layer lower than the line-of-sight pointer before the line-of-sight determination operation, to the gaze point indicated by the line-of-sight pointer and superimposes and displays the single-point AF frame on a layer higher than the line-of-sight pointer. Specifically, as illustrated in FIG. 7B, the single-point AF frame is displayed on the layer 712 higher than the layer 700 of the line-of-sight pointer. Similarly to the tracking AF frame in step S456 and the multi-point AF frame in step S457, the frame display of the single-point AF frame is moved to the detected gaze point by the line-of-sight determination operation and is displayed on a layer higher than the line-of-sight pointer. This makes it easy for the user to visually recognize movement of the single-point AF frame moved to the gaze point by the line-of-sight determination operation and to recognize the position of the subject on which AF is to be executed in a case where an AF execution instruction is issued.

In a case where it is determined that the line-of-sight pointer display setting is set to "OFF" in step S416, in step S459, the system control unit 50 does not display the line-of-sight pointer but displays the AF frame on a layer higher than the imaging information.

As described above, according to the present example embodiment, before a line-of-sight determination operation is performed by the user, the line-of-sight pointer indicating the gaze point is controlled to be superimposed and displayed on a layer higher than the AF frame, whereas after a line-of-sight determination operation is performed, the AF frame is controlled to be superimposed and displayed on a layer higher than the line-of-sight pointer. Accordingly, the user can visually recognize the line-of-sight pointer indicating a gaze point corresponding to a viewing direction of the user with ease before performing a line-of-sight determination operation, and thus the user can predict which position the frame display will be moved (shifted) to in a case where the user performs a line-of-sight determination operation. On the other hand, after performing a line-of-sight determination operation, the user can easily recognize the position of the frame display moved by the line-of-sight determination operation, and this makes it easy for the user to check a target of imaging-related processing such as AF.

The present example embodiment is also applicable to a case where an object, such as a text file and a folder, is to be selected by a line-of-sight input operation in an electronic device other than a digital camera, such as a PC, a tablet terminal, and a smartphone.

Figure 8:
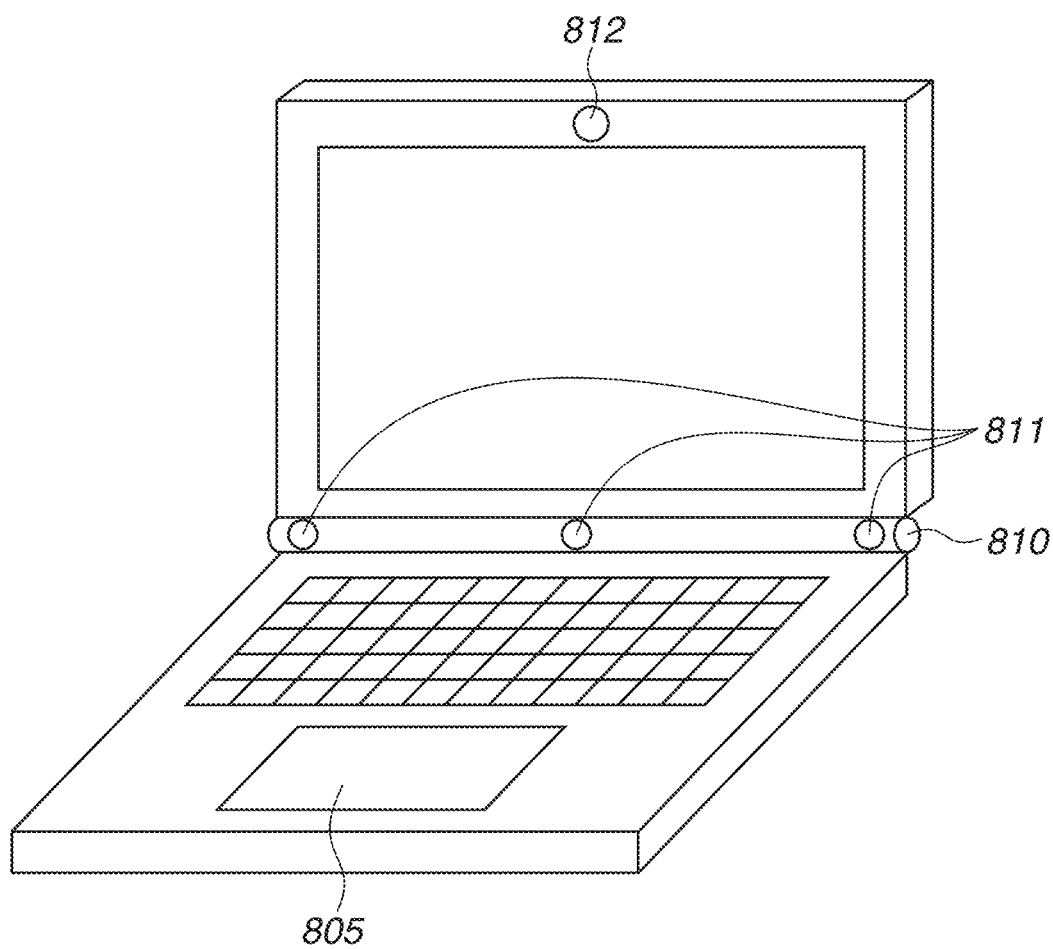
FIG. 8 is an external view illustrating a personal computer (PC) according to an example embodiment of the present disclosure.

FIGS. 8 and 9A to 9D are diagrams illustrating an example of a display or a configuration in a case where the present example embodiment is applied to a PC. FIG. 8 is a diagram illustrating a configuration in a case where the present example embodiment is applied to a PC, and FIGS. 9A to 9D illustrate an example of a display screen in a case where the present example embodiment is applied to a PC. In FIG. 8, a touch pad 805 corresponding to the touch panel 70*a* according to the present example embodiment is illustrated. A line-of-sight detection device 810 as an independent unit corresponding to the line-of-sight detection block 160 for use in a PC is connected to the PC. The eye movement of the user is detected using cameras 811 of the line-of-sight detection device 810 and a built-in camera 812 of the PC, and the eye direction (line-of-sight) of the user is detected. A gaze point on a display screen is identified based on the detected line-of-sight.

Figure 9A:
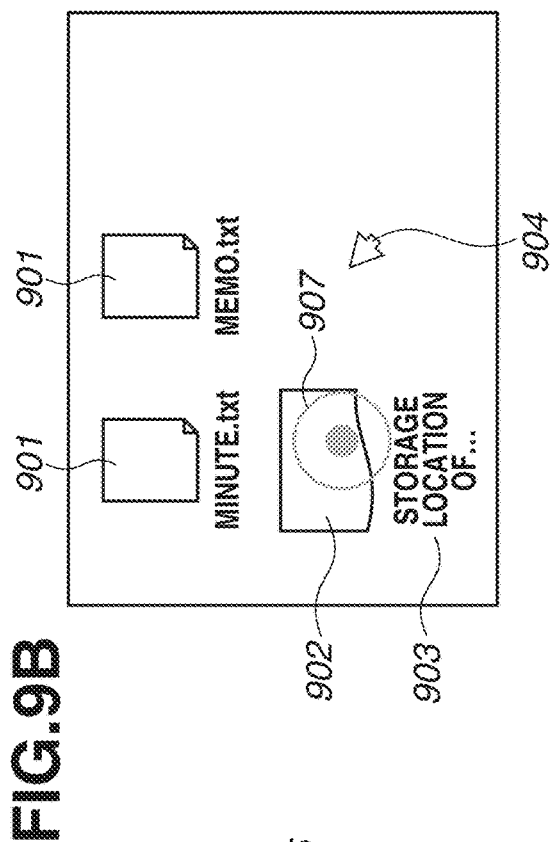
FIGS. 9A to 9D are diagrams illustrating a display example in a case where an example embodiment of the present disclosure is applied to a PC.

In FIG. 9A, an icon 901 indicating a text file, an icon 902 indicating a folder, an icon 910, a folder name 903, a mouse cursor 904, and a line-of-sight pointer 905 are displayed. The line-of-sight pointer 905 indicates a gaze point, and display of the line-of-sight pointer 905 is for the user to recognize a gaze point identified based on the viewing direction of the user by the line-of-sight detection device 810. At this time, the mouse cursor 904 is superimposed and displayed over the icon 910, and thus detailed information 906 about the folder indicated by the icon 910 is displayed. At this time, the line-of-sight pointer 905 is superimposed and displayed over the mouse cursor 904 and the detailed information 906. Specifically, the display order of the objects in FIG. 9A is the layer 700 of the line-of-sight pointer 905, a layer 701 of the mouse cursor 904, and the layer 702 of the detailed information 906 from the top as illustrated in FIG. 7A.

Figure 9B:
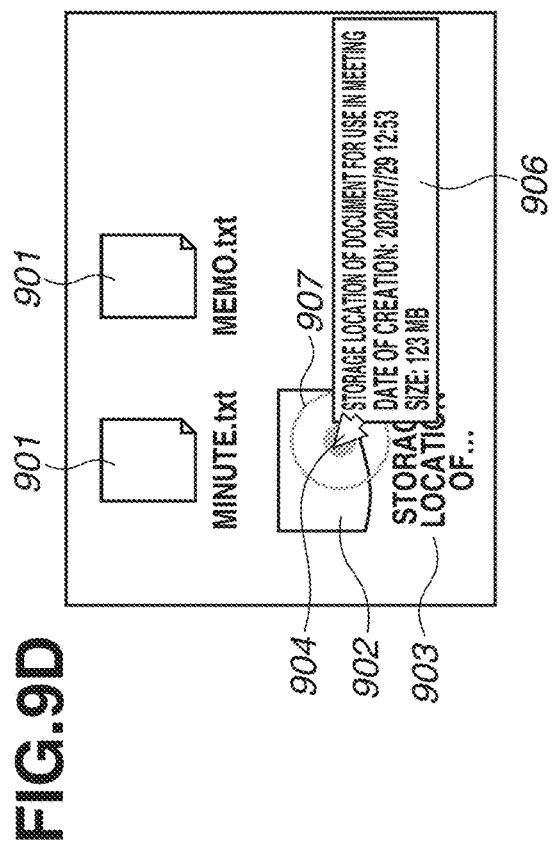
Figure 9C:
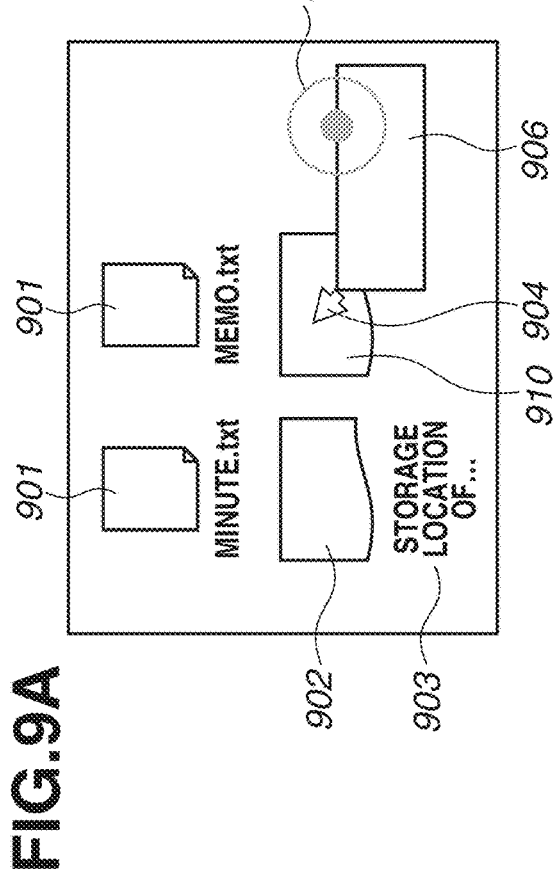
Figure 9D:
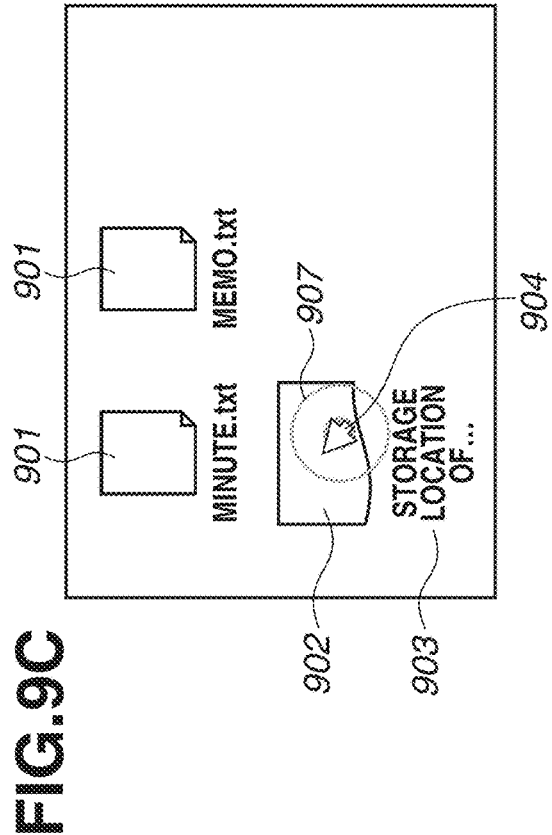

A description will be given of a case where the line-of-sight of the user is moved from the position of the line-of-sight pointer 905 in FIG. 9A to a position (on the icon 902) of a line-of-sight pointer 907 in FIG. 9B. After the movement of the line-of-sight, in a case where a line-of-sight determination operation is performed in the state illustrated in FIG. 9B, the mouse cursor 904 is moved (shifted) to the display position of the line-of-sight pointer 907 as illustrated in FIG. 9C. As described above, in a case where the mouse cursor 904 is moved to the display position of the line-of-sight pointer 907, the mouse cursor 904 is moved to the icon 902 indicating the folder, and the detailed information 906 about the display object such as the folder or file over which the mouse cursor 904 is superimposed and displayed is displayed. Specifically, the detailed information 906 about the object selected by the mouse cursor 904 as a result of execution of a specific function that is executed by moving the mouse cursor 904 in response to the line-of-sight determination operation by the user is displayed. At this time, the detailed information 906 is superimposed and displayed on a layer higher than the line-of-sight pointer 907. Specifically, the display order of the objects in FIG. 9C is a layer 711 of the mouse cursor 904, the layer 712 of the detailed information 906, and the layer 700 of the line-of-sight pointer 907 from the top as illustrated in FIG. 7B.

In a case where there is not a display object at a position to which the mouse cursor 904 is shifted, no detailed object information is displayed. The detailed information 906 is displayed after a predetermined time of about one second from when the mouse cursor 904 is shifted to the position of the icon 902 that is the display object. Thus, the detailed information 906 is not displayed in FIG. 9C, which is immediately after the mouse cursor 904 is shifted by a line-of-sight determination operation, whereas the detailed information 906 is displayed in FIG. 9D, which is after the predetermined time from when the mouse cursor 904 is shifted. The line-of-sight determination operation on the PC is not a button operation described above with reference to the digital camera 100 but, for example, a condition that a gaze state is continued for a predetermined time, a touch-on operation on the touch pad 805, a click operation on a mouse, or a predetermined operation on a keyboard. Accordingly, the user can perform a line-of-sight determination operation more naturally and intuitively.

According to the present example embodiment, detailed information that is a result of execution of a line-of-sight determination operation is displaying of a display layer (e.g., the layer 712 in FIG. 7B) between the mouse cursor 904 and the line-of-sight pointer. Alternatively, the display order of the mouse cursor 904 and the detailed information can be switched. Further, the mouse cursor 904 and the detailed information can be on the same layer. Specifically, the detailed information is to be displayed on a layer higher than the line-of-sight pointer after a line-of-sight determination operation.

As described above, before a line-of-sight determination operation by the user, the line-of-sight pointer indicating a gaze point is superimposed and displayed over detailed information, and thus the user can visually recognize the gaze point corresponding to a viewing direction of the user with ease. On the other hand, after a line-of-sight determination operation, detailed information is superimposed and displayed over the line-of-sight pointer, and thus the user can check the detailed information with ease without being annoyed by the line-of-sight pointer. Further, after a line-of-sight determination operation, the mouse cursor 904 is superimposed and displayed over the line-of-sight pointer and detailed information, and thus the user can visually recognize the mouse cursor 904 moved quickly by a great distance to the gaze point in response to the line-of-sight determination operation.

While FIG. 8 illustrates the PC according to another example embodiment, the present example embodiment is implementable also by performing a line-of-sight determination operation using a mouse, a pointing device, or a joystick instead of the touch pad 805 of the PC. Specifically, in a case where a predetermined operation, such as a click operation, a press operation, an operation of shaking a device horizontally, or an operation of drawing a circle is performed, it is determined that the line-of-sight determination operation is performed. The touch pad, the mouse, the pointing device, and the joystick do not have to be built in the PC and can be built in external hardware.

The display form of the line-of-sight pointer is not limited to those described above. Instead of the form that is a combination of an internal circle (shaded) and an external circle frame, a form including an internal circle, a form including an external circle frame, or a form including a circle that can be changed in size by the user as desired can be employed. For example, a color of the line-of-sight pointer can be changed based on a staying time of the gaze point. For example, in a case where the staying time of the gaze point is longer than a predetermined time, the color is red, whereas in a case where the staying time is shorter than the predetermined time, the color is blue.

Means for setting a display form by the user can be provided. The display order of the display layers can be changed as the display form is changed.

Alternatively, in a case where a line-of-sight determination operation is performed by the user, the frame 604 indicating the single-point AF frame is moved to the position of the line-of-sight pointer 606 and then the line-of-sight pointer 606 is hidden. For example, while a line-of-sight determination operation is continued (the first shutter switch 62 is pressed), i.e., while AF is executed, the line-of-sight pointer 606 is hidden, and when AF execution ends, the line-of-sight pointer 606 is displayed again. The foregoing control makes it easier to visually recognize the display of the frame 604 indicating the single-point AF frame in a situation where the user is likely to wish to check the subject at the AF execution position on the LV image immediately after the line-of-sight determination operation. The display can be controlled to hide the line-of-sight pointer 606, in addition to the time during AF execution, until a predetermined time set by the user passes. The frame display such as the AF frame displayed on a layer higher than the line-of-sight pointer by the determination operation by the user is reset to the display order before the determination operation in a case where the processing proceeds to the mode processing different from the imaging mode processing in step S302 in FIG. 3. Specifically, the display order is reset in a case where the menu button 81 is pressed by the user to proceed to setting menu mode processing or in a case where the digital camera 100 is turned off. A trigger to reset the display order changed by a determination operation to the display order set before the determination operation is not limited to those described above, and the display order can be controlled to be reset and returned to the display order set before the determination operation in a case where a predetermined time passes after the determination operation.

Further, even during the process of the control flowchart in FIGS. 4A1 to 4A3, in a case where the operation unit 70 is operated to move the AF frame or to change various imaging parameters, the function corresponding to the operation is executed. For example, in a case where the multi-controller 83 is pushed toward any one of the eight directions, the AF frame is moved based on the operation direction. In a case where the main electronic dial 71 is operated, the function (specifically, shutter speed change) assigned to the main electronic dial 71 is executed.

The present disclosure is also realized by executing the following processing. Specifically, software (program) for realizing the functions of the above-described example embodiments is supplied to a system or an apparatus via a network or a recording medium, and a computer (or a central processing unit (CPU) or a micro-processing unit (MPU)) of the system or the apparatus reads program codes and executes the read program codes. In this case, the program and the recording medium storing the program constitute the present disclosure.

The various types of control described above as being performed by the system control unit 50 can be performed by a single piece of hardware, or a plurality of pieces of hardware (e.g., a plurality of processors or circuits) can share the processing to control the entire apparatus.

Further, while the case where the present invention is applied to the digital camera is described as an example in the above-described example embodiments, the disclosed example is not a limiting example, and the present invention is applicable to any electric device to which the user can designate a position by line-of-sight input and operation on an operation member. Specifically, the present invention is applicable to a PC, a personal digital assistant (PDA), a mobile phone terminal, a mobile image viewer, and a head mount display. Further, the present invention is also applicable to a digital photo frame, a music player, a game machine, an electronic book reader, a tablet terminal, a smartphone, a projection apparatus, a household appliance that includes a display, and an in-vehicle apparatus that includes a display.

Further, while various example embodiments of the present disclosure are described in detail above, the present invention is not limited to the specific example embodiments and encompasses various forms within the scope and spirit of the present invention. While the touch panel 70a is described as an example of a position movement instruction member for use in combination with line-of-sight input, another operation unit such as a button or a dial can be employed. Further, while a display position is indicated by the AF frame, an icon frame or a parameter setting frame can be employed, or an indicator display different from the AF frame, such as the mouse cursor 904, can be employed. While whether to display or not display the line-of-sight pointer is determined based on user settings, the determination can be based on whether the line-of-sight input function is set to "ON" or "OFF" (the item 503 in FIGS. 5A and 5B) or based on whether there is an eye approach to the eyepiece 16.

Further, the present invention is also applicable to a control apparatus that communicates with an image capturing device (including a network camera) via wired or wireless communication and remotely controls the image capturing device as well as a main body of the image capturing device. Examples of an apparatus that remotely controls an image capturing device are a smartphone, a tablet PC, and a desktop PC. The control apparatus remotely controls the image capturing device by notifying the image capturing device of commands for various operations and settings based on operations and processing performed on the control apparatus. Further, a live view image captured by the image capturing device can be received via wired or wireless communication and displayed on the control apparatus.

The present invention is also realized by executing the following processing. Specifically, software (program) for realizing the functions of the above-described example embodiments is supplied to a system or an apparatus via a network or a recording medium, and a computer (or a central processing unit (CPU) or a micro-processing unit (MPU)) of the system or the apparatus reads program codes and executes the read program codes. In this case, the program and the recording medium storing the program constitute the present invention.

According to the present disclosure, in a case where an operation is performed by line-of-sight input, a position (designated position) designated by a gaze point is displayed in such a manner that the designated position is visually recognized more easily after a determination operation is performed by a user than before the determination operation. This makes it easier to recognize a difference between a viewing position of the user and a gaze point before the determination of the designated position and also makes it easier to check the determined designated position.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While to example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-177596, filed Oct. 22, 2020, which is hereby incorporated by reference herein in its entirety.

What is claimed is:

1. An electronic device comprising:
   one or more processors, and
   one or more memories that store instructions, which when executed by the one or more processors, cause the electronic device to function as:
   a detection unit configured to detect a gaze point, which is based on line-of-sight of a user viewing, on a display unit; and
   a control unit configured to display an indicator on the display unit indicating the gaze point,
   wherein in a case where an operation is performed on an operation unit by the user, the control unit performs control to display a display item at the gaze point and to display the indicator, and
   wherein the control unit changes a display order in which the indicator is displayed over the display item to a display order in which the indicator is displayed under the display item in response to the operation performed on the operation unit by the user.

2. The electronic device according to claim 1, wherein before the operation is performed on the operation unit by the user, the control unit displays the display item at a position based on a predetermined condition, and in a case where the operation is performed on the operation unit by the user, the control unit performs control to move and display the display item to the gaze point.

3. The electronic device according to claim 1, wherein before the operation is performed on the operation unit by the user, the control unit performs control to display, in displaying the display item at a position based on a predetermined condition, the indicator under the display item in such a manner that the indicator and the display item overlap with one another.

4. The electronic device according to claim 1, wherein before the operation is performed on the operation unit by the user, the control unit performs control to display, in displaying the display item at a position based on a predetermined condition, the indicator over the display item in such a manner that the indicator and the display item overlap with one another, and in a case where the operation is performed on the operation unit by the user, the control unit performs control to display the indicator under the display item in such a manner that the indicator and the display item overlap with one another.

5. The electronic device according to claim 1,
wherein the electronic device is an image capturing device configured to perform imaging processing using an imaging parameter,
wherein the control unit further performs control to display information about the imaging parameter on the display unit and to display the indicator over the information about the imaging parameter in such a manner that the indicator and the information overlap with one another.

6. The electronic device according to claim 1, wherein the display item indicates a position to execute automatic focal point adjustment.

7. The electronic device according to claim 1, wherein information about a position selected by the display item indicates a result of automatic focal point adjustment executed at the position where the display item is displayed.

8. The electronic device according to claim 1, wherein information about a position selected by the display item is displayed in place of the displayed display item.

9. The electronic device according to claim 1, wherein in a state where the user holds a grip portion of the electronic device with a right hand, the operation unit is disposed at a position which is on an opposite side to a subject side and on a side closer to a shutter button configured to issue an imaging instruction with respect to a central position on a surface on the opposite side, and which is on a side closer to the grip portion.

10. The electronic device according to claim 1, wherein the operation unit is a shutter button configured to issue an imaging instruction.

11. The electronic device according to claim 1, further comprising:
a finder and an image capturing unit configured to capture an image of a subject,
wherein the display unit is a display unit inside the finder.

12. The electronic device according to claim 1, wherein in a case where the operation on the operation unit is performed by the user, after the display item is moved and displayed to the gaze point, the control unit performs control to not display the indicator while an auto-focus (AF) execution instruction is issued by the user, regardless of a display setting about the indicator that is set by the user.

13. The electronic device according to claim 1, wherein the display item is a mouse cursor.

14. The electronic device according to claim 1, wherein information about a position selected by the display item is information about an object at a position where the display item is displayed.

15. A control method for controlling an electronic device, the control method comprising:
detecting a gaze point, which is based on line-of-sight of a user viewing, on a display unit; and
performing control to display an indicator on the display unit to indicate the gaze point,
wherein in a case where an operation is performed on an operation unit by the user, performing control to display a display item at the gaze point and to display the indicator, and
wherein the performing control changes a display order in which the indicator is displayed over the display item to a display order in which the indicator is displayed under the display item in response to the operation performed on the operation unit by the user.

16. A non-transitory computer-readable recording medium that stores a program for causing a computer to execute a control method for an electronic device, the control method comprising,
detecting a gaze point, which is based on line-of-sight of a user viewing a display unit; and
performing control to display an indicator on the display unit to indicate the gaze point, wherein in a case where an operation is performed on an operation unit by the user, performing control to display a display item at the gaze point and to display the indicator, and
wherein the performing control changes a display order in which the indicator is displayed over the display item to a display order in which the indicator is displayed under the display item in response to the operation performed on the operation unit by the user.

17. An electronic device comprising:
one or more processors, and
one or more memories that store instructions, which when executed by the one or more processors, cause the electronic device to function as:
a detection unit configured to detect a gaze point, which is based on line-of-sight of a user viewing, on a display unit; and
a control unit configured to display an indicator on the display unit indicating the gaze point,
wherein in a case where an operation is performed on an operation unit by the user, the control unit performs control to display a display item at the gaze point and to display the indicator, and
wherein before the operation is performed on the operation unit by the user, the control unit performs control to not display the display item, and in a case where the operation is performed on the operation unit by the user, the control unit performs control to display the display item at a display position of the indicator.

18. A control method for controlling an electronic device, the control method comprising:
detecting a gaze point, which is based on line-of-sight of a user viewing, on a display unit; and
performing control to display an indicator on the display unit to indicate the gaze point,
wherein in a case where an operation is performed on an operation unit by the user, performing control to display a display item at the gaze point and to display the indicator, and
wherein before the operation is performed on the operation unit by the user, performing control to not display the display item, and in a case where the operation is performed on the operation unit by the user, performing control to display the display item at a display position of the indicator.

19. A non-transitory computer-readable recording medium that stores a program for causing a computer to execute a control method for an electronic device, the control method comprising, detecting a gaze point, which is based on line-of-sight of a user viewing a display unit; and performing control to display an indicator on the display unit to indicate the gaze point, wherein in a case where an operation is performed on an operation unit by the user, performing control to display a display item at the gaze point and to display the indicator, and wherein before the operation is performed on the operation unit by the user, performing control to not display the display item, and in a case where the operation is performed on the operation unit by the user, performing control to display the display item at a display position of the indicator.

\* \* \* \* \*